US012633178B2

(12) United States Patent
Naiki

(10) Patent No.: US 12,633,178 B2
(45) Date of Patent: May 19, 2026

(54) SELF-DIAGNOSIS APPARATUS AND SELF-DIAGNOSIS SYSTEM

(71) Applicant: ROHM CO., LTD., Kyoto (JP)

(72) Inventor: Takashi Naiki, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 328 days.

(21) Appl. No.: 18/457,814

(22) Filed: Aug. 29, 2023

(65) Prior Publication Data

US 2023/0410574 A1 Dec. 21, 2023

Related U.S. Application Data

(63) Continuation of application No. PCT/JP2022/007829, filed on Feb. 25, 2022.

(30) Foreign Application Priority Data

Mar. 4, 2021 (JP) ................................ 2021-034640

(51) Int. Cl.
*G07C 5/08* (2006.01)

(52) U.S. Cl.
CPC ......... *G07C 5/0808* (2013.01); *G07C 5/0825* (2013.01); *G07C 5/0833* (2013.01)

(58) Field of Classification Search
None
See application file for complete search history.

(56) References Cited

U.S. PATENT DOCUMENTS

| | | | | |
|---|---|---|---|---|
| 5,414,470 A * | 5/1995 | Hotta | H04N 5/211 348/E5.009 |
| 8,498,430 B2 * | 7/2013 | Hess | H03G 3/32 381/86 |
| 11,538,289 B2 * | 12/2022 | Kim | G06N 5/041 |
| 12,119,612 B2 * | 10/2024 | Ito | H01S 5/34333 |

(Continued)

FOREIGN PATENT DOCUMENTS

| | | |
|---|---|---|
| CN | 112328438 A | 2/2021 |
| JP | 2014-232351 A | 12/2014 |

(Continued)

OTHER PUBLICATIONS

International Search Report for PCT/JP2022/007829, mailed on May 17, 2022.

(Continued)

*Primary Examiner* — Daniel L Greene
*Assistant Examiner* — Robert L Pinkerton
(74) *Attorney, Agent, or Firm* — Rabin & Berdo, P.C.

(57) ABSTRACT

A self-diagnosis apparatus has: a self-diagnosis control unit that outputs a predetermined self-diagnosis information to an information output unit; an information detection unit that detects output information outputted from the information output unit in accordance with the self-diagnosis information, and outputs a result of the detection as detection information; and abnormality judgment unit that compares the self-diagnosis information and the detection information during a predetermined synchronization window period, and in a case where difference information of a result of the comparison exceeds a predetermined range information, judges that there is abnormality in the information output unit and outputs abnormality information.

25 Claims, 5 Drawing Sheets

(56) References Cited

U.S. PATENT DOCUMENTS

| | | | | |
|---|---|---|---|---|
| 2015/0261637 | A1* | 9/2015 | Ouchi | G06F 11/27 714/30 |
| 2017/0234691 | A1* | 8/2017 | Abramson | G01C 21/3626 701/442 |
| 2017/0370498 | A1* | 12/2017 | Kawamura | H02P 29/024 |
| 2018/0083914 | A1* | 3/2018 | Yamaura | H04W 4/027 |
| 2021/0306551 | A1* | 9/2021 | Okabe | B60R 11/04 |
| 2021/0403037 | A1* | 12/2021 | Horigome | G06V 20/56 |
| 2022/0289250 | A1* | 9/2022 | Oba | G08G 1/16 |
| 2023/0071294 | A1* | 3/2023 | Takahata | H04N 5/66 |

FOREIGN PATENT DOCUMENTS

| | | | |
|---|---|---|---|
| JP | 2015-126572 | A | 7/2015 |
| JP | 2015-176402 | A | 10/2015 |
| JP | 2018-186322 | A | 11/2018 |

OTHER PUBLICATIONS

Written Opinion of the International Searching Authority for PCT/JP2022/007829, mailed on May 17, 2022.

Office Action for corresponding Japanese patent application No. 2023-503777 with an English translation by machine dated Dec. 9, 2025.

* cited by examiner

SELF-DIAGNOSIS APPARATUS AND SELF-DIAGNOSIS SYSTEM

CROSS REFERENCE TO RELATED APPLICATIONS AND INCORPORATION BY REFERENCE

This is a continuation application (CA) of PCT Application No. PCT/JP2022/007829, filed on Feb. 25, 2022, which claims priority to Japan Patent Application No. P2021-034640 filed on Mar. 4, 2021 and is based upon and claims the benefit of priority from prior Japanese Patent Application No. P2021-034640 filed on Mar. 4, 2021 and PCT Application No. PCT/JP2022/007829, filed on Feb. 25, 2022; the entire contents of each of which are incorporated herein by reference.

TECHNICAL FIELD

The present invention relates to a self-diagnosis apparatus and a self-diagnosis system that diagnose whether or not an information output apparatus operates normally in advance.

BACKGROUND

Information output apparatuses that electrically output necessary information by means of speakers, buzzers, backlight panels, displays, and the like have conventionally been known. For example, in a vehicle including an automobile, in a case where there is some abnormality or a predictor in an electronics system of the automobile, particularly, a control system of the vehicle, it is necessary to promptly notify the user of the abnormality of the system, and information demanding repair or maintenance.

DETAILED DESCRIPTION

Figure 1:
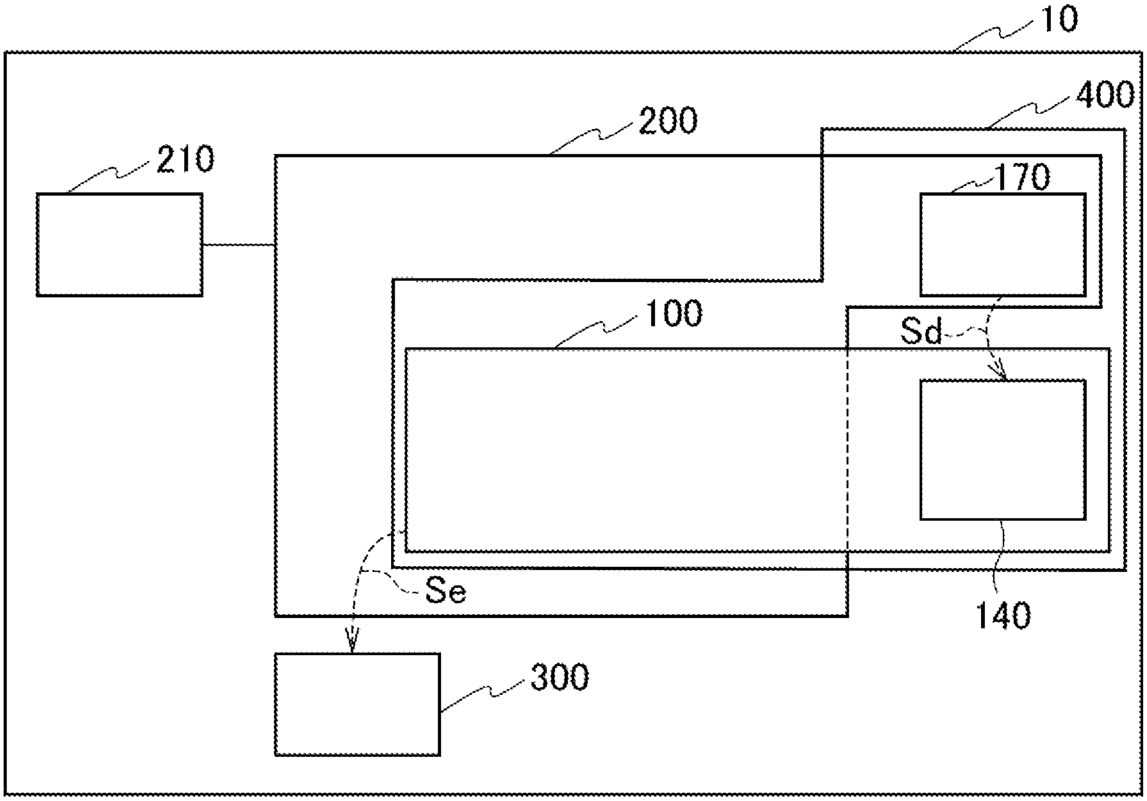
FIG. 1 is a block diagram showing a configuration of a self-diagnosis system including a self-diagnosis apparatus according to multiple embodiments.

Hereinafter, an example of a self-diagnosis apparatus and a self-diagnosis system according to the present embodiments will be described in detail with reference to the drawings. Note that the embodiments described below represent a comprehensive or specific example. Numerical values, shapes, materials, components, installation positions and connection forms of the components, steps, the order of the steps, and the like shown in the following embodiments are examples, and are not limited to the present disclosure. In addition, among the components in the following embodiments, components that are not described in the independent claim, which represents the highest concept, will be described as optional components. Moreover, the dimensional ratios of the drawings are exaggerated for the convenience of description, and may be different from actual ratios in some cases.

In addition, the following embodiments and modifications thereof may contain the same components in some cases, and the same components are denoted by common reference signs, and repetitive descriptions are omitted.

(Outline of Self-Diagnosis Apparatus and Self-Diagnosis System)

A self-diagnosis apparatus according to the embodiments can be installed in, for example, internal spaces, or external spaces in some cases, of mobile bodies such as vehicles including passenger cars and buses, trains, aircraft, spacecraft, ships, and submarines, as well as structures such as architecture including houses and offices, and factories. The self-diagnosis apparatus or the like diagnoses whether or not an information output unit which allows users in the mobile body and structure to recognize information through five senses such as sight, hearing, and smell operates normally before the information outputted from the information output unit becomes necessary. Particularly, the self-diagnosis apparatus according to the embodiments compares self-diagnosis information for causing appropriate output information to be generated, and detection information of an information detection unit that detects output information actually outputted from an information output unit, and judges whether or not the output information has been outputted normally. In addition, the judgment is executed by synchronizing, at an appropriate timing, and comparing the self-diagnosis information for causing appropriate output information to be generated and the detection information before the information output unit actually becomes necessary. If there is abnormality in the result of the comparison, an information output unit other than the information output unit detected to have the abnormality is caused to allow the user to recognize the abnormality. Such a configuration makes it possible to diagnose whether or not an information output unit can output information normally, in advance at an appropriate timing in order to allow the information output unit to output the information normally when the information output unit needs to output the information.

Examples of abnormality information to be outputted from a normal information output unit in a case where there is abnormality in one of the information output units include failure occurrence information which means a failure of an output system including the information output unit having the abnormality, repair need information which means to prompt repair of the system including the information output unit having the abnormality, and the like. The meanings of these pieces of abnormality information may be expressed by voice information or image information such as a text or an image, or the pieces of abnormality information and the meanings of the pieces of abnormality information may be described in association with each other in a manual or the like so that users can recognize the meanings.

A relation of a self-diagnosis apparatus 100 according to multiple embodiments, a control target 10 on which the self-diagnosis apparatus 100 is mounted, an electronic control apparatus 200 which controls the control target 10, a sensor unit 210, an information output unit 170, and an information detection unit 140 will be mainly outlined with reference to FIG. 1. The sensor unit 210 outputs various types of sensor information on the control target 10 to the electronic control apparatus 200, or to the self-diagnosis apparatus 100 as necessary. The electronic control apparatus 200 outputs information necessary for the user from the information output unit 170 in accordance with the status of the control target 10, acquired from the various types of sensor information. In addition, the electronic control apparatus 200 controls the control target 10 in accordance with the status of the control target 10 acquired from the various types of sensor information. Moreover, the electronic control apparatus 200 causes the information output unit 170 to output information in accordance with request actions such as operations of the users in some cases. The self-diagnosis apparatus 100 according to the embodiments inputs appropriate self-diagnosis information to the information output unit 170 and detects output information from the information output unit 170 by means of the information detection unit 140 before the information output unit 170 is actually driven. The self-diagnosis apparatus 100 compares the self-diagnosis information and detection information to judge whether or not the information output unit 170 is operating normally. The self-diagnosis apparatus 100 causes another information output unit 170 which has been confirmed to be operating normally as a result of the self-diagnosis to output information on the information output unit 170 having a failure to notify the users of the presence or absence of a failure, and prompts the users to repair the failure early. Note that examples of the control target 10 include mobile bodies such as vehicles including passenger cars and buses, trains, aircraft, spacecraft, ships, and submarines, as well as electronics in structures such as architecture including houses and offices, and factories mentioned above.

In addition, as mentioned above, the information output unit 170 mainly has a function of outputting information on the status of the control target 10, which is controlled by the electronic control apparatus 200. For example, in the case where the control target 10 is a vehicle, examples of the information output unit 170 include devices and the like which output information perceived by the user's five senses, such as a speaker which prompts seat belt wearing, an LED and an organic EL of an operation panel, and a fragrance emitting apparatus which prevents falling asleep or prompts comfortable driving. In addition, examples of the information detection unit 140 include a microphone which detects sound or vibration outputted from a speaker, an acceleration sensor, a light receiving element such as a photodiode which detects light outputted from an LED or an organic EL, a fragrance sensor which detects fragrance, and the like. Note that the information output unit 170 is not limited to the above-described devices and the like, and may be any apparatus that outputs information recognizable by the user's five senses such as a fan for ventilation, or a temperature controller including a heater or a cooler which changes the temperature or the humidity. In addition, the information detection unit 140 is also not limited to the above-described devices and the like, and may be any apparatus which is capable of detecting information recognizable by the user's five senses, such as an air flow detection sensor, a temperature sensor, or a humidity sensor.

Figure 2:
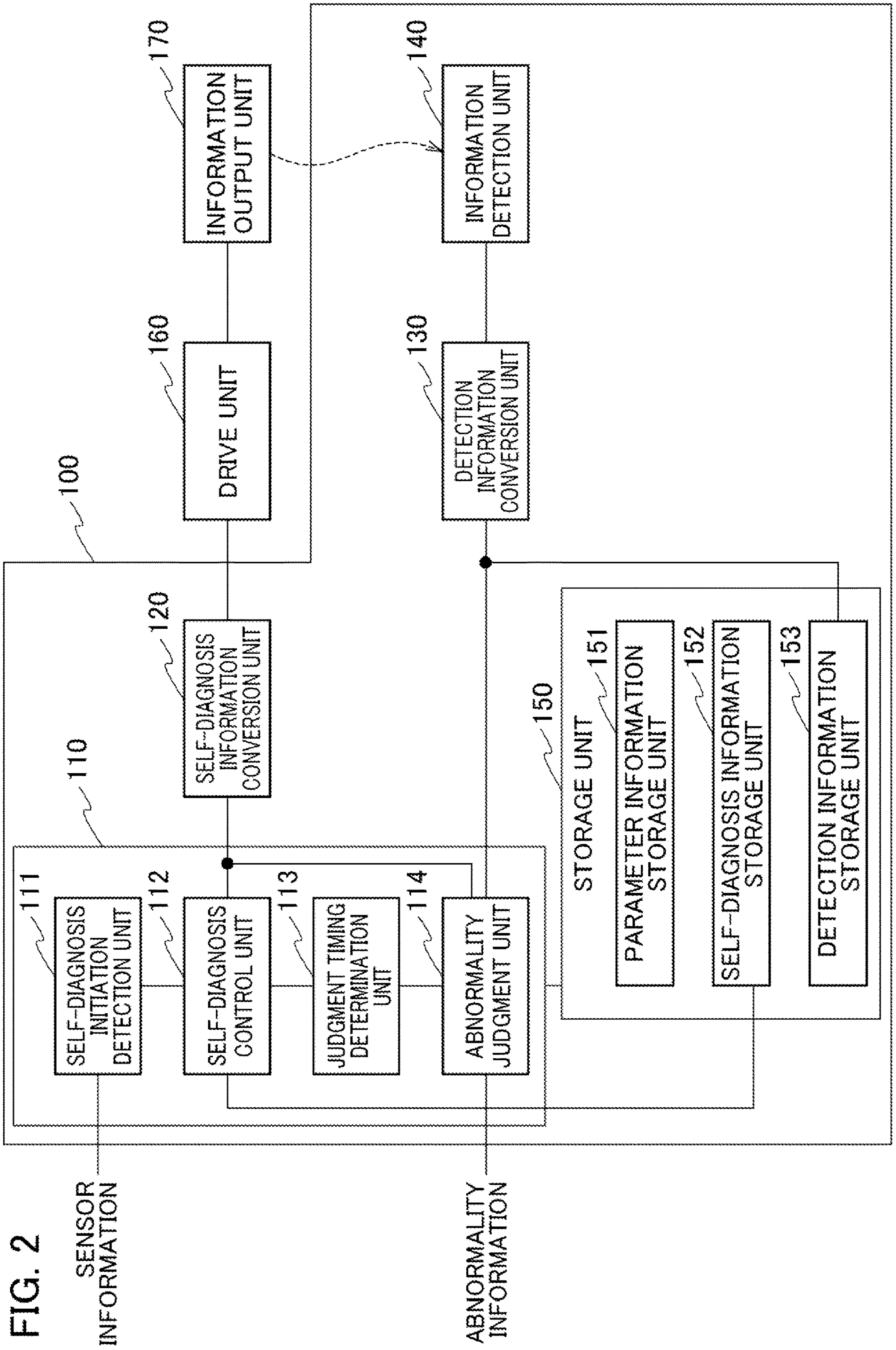
FIG. 2 is a block diagram showing a configuration of the self-diagnosis apparatus according to the multiple embodiments.

Moreover, as shown in FIG. 1, although some of the functions of the self-diagnosis apparatus 100 can be incorporated in the electronic control apparatus 200, it is also possible to configure the functions of the self-diagnosis apparatus 100 except for the information output unit 170, separately from the electronic control apparatus 200. Note that the detail of the relation between the functions of the self-diagnosis apparatus 100 and the functions of the electronic control apparatus 200 will be described later. In addition, a self-diagnosis system 400 comprises the above-mentioned self-diagnosis apparatus 100, the information output unit 170, and a drive unit 160 which is shown in FIG. 2 and which drives the information output unit 170. Abnormality information of the self-diagnosis system 400 is transmitted to an electronic apparatus 300 used by a user, and it is preferable that the user be notified of the abnormality information also when the user accesses the electronic apparatus 300. The electronic apparatus 300 may be an electronic apparatus used by a user, such as a computer arranged on a cloud, or a cellular phone, a PHS phone, a smartphone, or a portable information terminal carried by the user.

(Detail of Self-Diagnosis Apparatus)

A detailed configuration of the self-diagnosis apparatus 100 according to multiple embodiments will be described with reference to FIG. 2. The self-diagnosis apparatus 100 comprises a control unit 110, a self-diagnosis information conversion unit 120, a detection information conversion unit 130, at least one or more information detection units 140, and a storage unit 150. Note that the detection information conversion unit 130 may be included in the information detection unit 140 or the control unit 110 as described later. In addition, the information output unit 170 which allows users to recognize drive information outputted from the drive unit 160 shown in FIG. 2, through five senses such as sight, hearing, and smell, is basically included in the electronic control apparatus 200. In addition, a plurality of the information output units 170 are basically included in the electronic control apparatus 200.

That is, a plurality of information output units 170 are included in one self-diagnosis apparatus 100, and there is also a case where a plurality of information detection units 140 are included in one self-diagnosis apparatus 100. Note that there is also a case where one information detection unit 140 is capable of detecting output information of a plurality of information output units 170. Hence, the present embodiments are not limited to embodiments in which one information detection unit 140 is associated with one information output unit 170, and may be embodiments in which one information detection unit 140 is associated with a plurality of information output units 170. Moreover, the present embodiments are not limited to embodiments in which one drive unit 160 is associated with one information output unit 170, and may be embodiments in which one drive unit 160 is associated with a plurality of information output units 170. The detail of the above-described various embodiments will be described later.

The control unit 110 can be implemented by using a microcomputer including a CPU (Central Processing Unit) and the like. A computer program (a self-diagnosis program) for making the microcomputer function as the control unit 110 is installed and executed in the microcomputer. This makes the microcomputer function as multiple information processing units included in the control unit 110. Note that although in the present Description, an example in which the control unit 110 is implemented by using software, of course, it is also possible to configure the control unit 110 by preparing hardware dedicated to implementing each information processing. The dedicated hardware includes apparatuses such as application-specific integrated circuits (ASIC) and conventional circuit components which are arranged to execute the functions described in the embodiments. In addition, multiple information processing units included in the control unit 110 may be configured by using separate pieces of hardware. Moreover, the control unit 110 may also be shared with the electronic control apparatus 200 which is used to control the information output units 170 to be subjected to self-diagnosis.

For example, in the case where the self-diagnosis apparatus 100 is provided in a mobile body, the functions of the self-diagnosis apparatus 100 may be included in the functions of the electronic control apparatus 200 which controls the mobile body. In this case, embodiments are possible in which a self-diagnosis program which implements the functions of the self-diagnosis apparatus 100 is added to an electronic control program of the electronic control apparatus 200. In addition, embodiments are possible in which hardware which implements the functions of the self-diagnosis apparatus 100 is added to hardware of the electronic control apparatus 200. Moreover, a configuration is possible in which at least part of the self-diagnosis program of the self-diagnosis apparatus 100 is included in at least part of the electronic control program of the electronic control apparatus 200. Moreover, a configuration is possible in which at least part of the hardware of the self-diagnosis apparatus 100 is included in at least part of the hardware of the electronic control apparatus 200. In addition, the functions of the self-diagnosis apparatus 100 may be included in the functions of the electronic control apparatus 200 which has any functions and which is installed in internal spaces, or external spaces in some cases, of structures such as architecture including houses and offices, and factories.

The control unit 110 includes a self-diagnosis initiation detection unit 111, a self-diagnosis control unit 112, a judgment timing determination unit 113, and an abnormality judgment unit 114 as a plurality of information processing units.

The self-diagnosis initiation detection unit 111 is configured to detect a timing to initiate self-diagnosis processing and output a self-diagnosis initiation signal to the self-diagnosis control unit 112. The timing to initiate the self-diagnosis processing can be set to any timing.

For example, the self-diagnosis initiation detection unit 111 may be provided with a timer unit, which is not shown, so that the self-diagnosis initiation detection unit 111 is capable of recognizing the timing to initiate the self-diagnosis processing when the timer unit has measured a predetermined time. The timing to initiate the self-diagnosis processing is set by the self-diagnosis apparatus 100 in advance to be a regular or irregular timing. The self-diagnosis apparatus 100 stores this timing in a parameter information storage unit 151, so that the self-diagnosis initiation detection unit 111 is capable of reading this timing from the parameter information storage unit 151 and executing the timing. In addition, the self-diagnosis initiation detection unit 111 can also be configured to output the self-diagnosis initiation signal immediately after the self-diagnosis apparatus 100 is powered on, or immediately after the electronic control apparatus 200 including the self-diagnosis apparatus 100 is powered on. Such a configuration makes it possible for the self-diagnosis apparatus 100 to execute the self-diagnosis processing at an appropriate timing at the time of system activation.

In addition, for example, the electronic control apparatus 200 is capable of outputting an initiation signal for initiating the self-diagnosis to the self-diagnosis initiation detection unit 111 at any timing in an initiation processing sequence which is implemented by the electronic control apparatus 200 including the self-diagnosis apparatus 100 immediately after power-on. Since such a configuration makes it possible for the self-diagnosis apparatus 100 to execute the self-diagnosis processing during the operation of initialization processing of the system, it becomes possible to allow the users to recognize information indicating an abnormality state without making the users feel uncomfortable.

In addition, for example, there are cases where various sensor units 210 are disposed in the mobile body, and the self-diagnosis initiation detection unit 111 can also be configured not to output the self-diagnosis initiation signal at the timing when the outputs of the various sensor units 210 have abruptly changed. In addition, the self-diagnosis initiation detection unit 111 can also be configured to output a self-diagnosis inhibition signal to the self-diagnosis control unit 112 at the above-described timing. As an example, in the case where the sensor unit 210 is an acceleration sensor and the mobile body is a vehicle, the self-diagnosis initiation detection unit 111 can also be configured not to output the self-diagnosis initiation signal in the case where the mobile body has been suddenly accelerated or suddenly stopped, or in the case where the mobile body is turning a curve, or like cases. In addition, the self-diagnosis initiation detection unit 111 can also be configured to output the self-diagnosis inhibition signal as mentioned above in the case where the mobile body is in the above-described states. In addition, the self-diagnosis control unit 112 can also be configured such that even when there is self-diagnosis processing which has already been initiated, the self-diagnosis control unit 112 interrupts this self-diagnosis processing upon receipt of the self-diagnosis inhibition signal. In this case, the self-diagnosis control unit 112 can also be configured to resume the interrupted self-diagnosis processing upon receipt of a self-diagnosis inhibition release signal. For example, the self-diagnosis initiation detection unit 111 can execute the following processing in the case where the user is not concentrating on the operation of the mobile body, such as the case where the mobile body has not been suddenly accelerated or suddenly stopped, the case where the mobile body is not turning a curve, or like cases. That is, the self-diagnosis initiation detection unit 111 can also be configured to output the self-diagnosis initiation signal or the self-diagnosis inhibition release signal to the self-diagnosis control unit 112 in the above cases. These configurations can also be implemented by inputting outputs from the various sensor units 210 connected to the electronic control apparatus 200 to the self-diagnosis initiation detection unit 111. In addition, the electronic control apparatus 200 can be configured to determine to stop the self-diagnosis processing of the self-diagnosis apparatus 100 in accordance with outputs from the various sensor units 210, and output a self-diagnosis processing stop signal to the self-diagnosis initiation detection unit 111. The electronic control apparatus 200 can be configured to thereafter determine to resume the self-diagnosis processing of the self-diagnosis apparatus 100 in accordance with outputs from the various sensor units 210, and output a self-diagnosis processing stop release signal to the self-diagnosis initiation detection unit 111.

As mentioned above, the self-diagnosis initiation detection unit 111 is also capable of keeping the self-diagnosis inhibition signal active in the case where output values of the various sensor units 210 have largely changed (a large change has occurred in the mobile body), or in the case where a large change which occurred in the mobile body is continuing. The self-diagnosis control unit 112 is configured not to conduct the self-diagnosis processing while the self-diagnosis inhibition signal is active, or until the self-diagnosis inhibition release signal is inputted. The self-diagnosis inhibition signal may be a signal having the highest priority in the self-diagnosis initiation detection unit 111. Such a configuration makes it possible for the self-diagnosis apparatus 100 to execute the self-diagnosis processing at an appropriate timing by not executing the self-diagnosis processing in the case where the user is concentrating on another operation.

In addition, for example, the self-diagnosis initiation detection unit 111 can also be configured to output the self-diagnosis initiation signal to the self-diagnosis control unit 112 at the timing when the user has taken a seat. For example, in the case where the electronic control apparatus 200 is mounted on a vehicle, the following processing can be executed. Upon detecting that the user has taken a seat including the driver's seat, the electronic control apparatus 200 outputs a seating detection signal to the self-diagnosis initiation detection unit 111, making it possible for the self-diagnosis initiation detection unit 111 to detect the timing when the user has taken the seat. Although the electronic control apparatus 200 requires seating sensors in the seats, seating sensors have been widespread as sensors associated with so-called seat belt reminders, smart airbags, and the like. If there is abnormality in the information output unit 170 which allows a user to recognize various pieces of information in the case where the user uses a mobile body such as a vehicle, such a configuration makes it possible to allow the user to recognize that there is abnormality at an adequate timing. In addition, in the case where a navigation system is mounted on a vehicle, various pieces of information detected by the navigation system can be inputted to the self-diagnosis initiation detection unit 111 as the sensor information. For example, in the case where a vehicle is approaching an intersection, information that the vehicle is approaching the intersection can be inputted to the self-diagnosis initiation detection unit 111 as the sensor information.

The self-diagnosis control unit 112 is configured to recognize the type of the information output unit 170 to be subjected to the self-diagnosis, and execute processing to output the self-diagnosis information to the information output unit 170, upon input of the self-diagnosis initiation signal. Then, the abnormality judgment unit 114 compares the self-diagnosis information and the detection information in the case where the information detection unit 140 has detected the output information outputted from the information output unit 170, to execute the self-diagnosis. In the case where the self-diagnosis inhibition release signal has been received as well, the self-diagnosis control unit 112 executes the above-described processing to output the self-diagnosis information. In addition, in the case where there are a plurality of the information output units 170, the self-diagnosis control unit 112 can also determine the order of self-diagnosis processing for the information output units 170 on which the self-diagnosis processing should be executed.

For example, in the case where there is an information output unit 170 which the electronic control apparatus 200 intends to use, the self-diagnosis processing on this information output unit 170 can be configured to be executed before this information output unit 170 is actually used. In this case, a configuration in which information output unit identification information for identifying the information output unit 170 to be used is inputted from the electronic control apparatus 200 to the self-diagnosis control unit 112 is also possible. In addition, a configuration in which the information output unit identification information for identifying the information output unit 170 to be used is inputted from the electronic control apparatus 200 to the above-mentioned self-diagnosis initiation detection unit 111, and the information output unit identification information is contained in the self-diagnosis initiation signal is also possible. Such a configuration makes it possible to adequately allow the user to recognize that there is abnormality before the timing of use in the case where there is abnormality in the information output unit 170 which the electronic control apparatus 200 intends to use.

Upon input of the self-diagnosis initiation signal from the self-diagnosis initiation detection unit 111, the self-diagnosis control unit 112 identifies the information output units 170 connected to the self-diagnosis apparatus 100. For example, the self-diagnosis apparatus 100 is capable of storing, in advance, identification information of the information output units 170 connected to the self-diagnosis apparatus 100 in association with self-diagnosis information in a self-diagnosis information storage unit 152, which will be described later. The self-diagnosis control unit 112 determines the order of executing self-diagnosis for the identified information output units 170, and reads the self-diagnosis information from the self-diagnosis information storage unit 152 in accordance with the determined order. The self-diagnosis control unit 112 outputs the self-diagnosis information to the self-diagnosis information conversion unit 120 in accordance with the determined order.

For example, the self-diagnosis control unit 112 may be configured to execute the self-diagnosis in order from an information output unit 170 having a long accumulated time of use to an information output unit 170 having a short accumulated time of use. In addition, the self-diagnosis control unit 112 may be configured to execute the self-diagnosis in order from an information output unit 170 having a short MTBF (Mean Time Between Failure) to an information output unit 170 having a long MTBF. In addition, the self-diagnosis control unit 112 may be configured such that in the case where there is an information output unit 170 having an accumulated time of use exceeding MTBF, the self-diagnosis control unit 112 executes the self-diagnosis while increasing the priority of this information output unit 170. In addition, the order of executing the self-diagnosis may be determined based on any combination of the above-described orders. The above-described accumulated time of use and MTBF can be stored in the self-diagnosis information storage unit 152 in association with identification information of each information output unit 170. For example, the accumulated time of use may be stored in the self-diagnosis information storage unit 152 by inputting the information output unit identification information, a usage start signal, and a usage end signal to the self-diagnosis apparatus 100 every time the electronic control apparatus 200 uses the information output unit 170. In addition, a configuration in which the MTBF of each information output unit 170 is stored in the self-diagnosis information storage unit 152 in advance is also possible. In addition, the self-diagnosis control unit 112 may be configured to execute the self-diagnosis in order from an information output unit 170 having a large accumulated time of use or MTBF.

In addition, the self-diagnosis information is preferably such information that information outputted from the information output unit 170 by the self-diagnosis information is unlikely to be recognized by human. For example, when the self-diagnosis information is information on hearing, the self-diagnosis information is preferably a pattern of sound information having a frequency outside of around 20 Hz to around 20 kHz. In addition, when the self-diagnosis information is information on hearing for around 20 Hz to around 20 kHz, the self-diagnosis information is preferably of a sound volume which is unlikely to be recognized by human. In addition, when the self-diagnosis information is information on sight, the self-diagnosis information is preferably pattern information of light having a wavelength outside of around 360 nm to around 860 nm. Otherwise, when the wavelength of the self-diagnosis information indicates light having a wavelength of around 360 nm to 860 nm, the following processing is preferably executed. For example, in the case where the self-diagnosis information is light having a wavelength of around 360 nm to around 860 nm, the flux of light which indicates the amount of light emitted from a light source is preferably processed into a value which is difficult for the user to visually recognize. Since the magnitude of the flux of light is inversely proportional to the square of the distance, it is preferable that the information output units 170 and the information detection unit 140 be arranged adjacent to each other. Note that there is a case where a light guide is provided using a resin or the like between the light source such as an LED and a surface of a display panel or the like in order to efficiently take out the light. In this case, the information detection unit 140 may be arranged close to the light guide. In addition, it becomes possible to slightly adjust the flux of light emitted from the light source to a value which is difficult for the user to recognize, by making the light emitted from the information output unit 170 have a pattern of light with a small duty cycle. Note that the brink frequency in this case is preferably about 50 Hz or more. Moreover, it is preferable that the brink frequency be a frequency different from the frequency of the information output unit 170 used by the electronic control apparatus 200, and that the brink time be a time shorter than the brink time used by the electronic control apparatus 200. It is preferable that the brink frequency be several hundred Hz or more and that the brink time be several milliseconds or less. In this way, by lowering the magnitude of the flux of light, and arranging the information output unit 170 and the information detection unit 140 adjacent to each other, and further performing slight adjustment such as lowering the duty cycle of the lighting, it is possible to visually lower the magnitude of the flux of light of the light source, and to thus achieve output information of the information output unit 170 which is difficult for the users to recognize. However, in the case where LEDs are provided as the light source of the information output unit 170, if the LEDs have determined wavelengths and are configured to emit light out of the visible light so that the light should not be seen by humans, LEDs for the light source have to be provided separately from that for alert. This is however not appropriate because this is not designed for conducting self-diagnosis on the light source for alert and the circuit thereof. For this reason, it is preferable that the LEDs provided as the light source of the information output unit 170 be LEDs which emit visible light. In addition, it is possible to provide a light adjustment apparatus between the vision of the user and the information output unit 170 such that the transmittance of the light adjustment apparatus is lowered in the case where the self-diagnosis processing is executed and that the transmittance of the light adjustment apparatus is raised in the case where the self-diagnosis processing is not executed.

In addition, for example, when the self-diagnosis information is information on fragrance, the self-diagnosis information is preferably of a pattern indicating a fragrance of an amount that is unlikely to be recognized by the users. In addition, it is also possible to configure the information output unit 170 or the information detection unit 140 to emit a fragrance component which eliminates the fragrance used for self-diagnosis, after the self-diagnosis.

Moreover, the self-diagnosis information may be configured to be stored in advance in the self-diagnosis information storage unit 152 in association with the identification information of the information output unit 170.

The judgment timing determination unit 113 is configured to determine the timing when the abnormality judgment unit 114 judges whether or not the information output unit 170 is operating normally. For example, by synchronizing the timing when the self-diagnosis control unit 112 has outputted the self-diagnosis information and the timing when the abnormality judgment unit 114 judges the detection information outputted from the information detection unit 140, it becomes possible to improve the SN ratio (signal-to-noise ratio) and to thus judge abnormality more adequately. In addition, in the case where the self-diagnosis information contains a specific frequency component, it also becomes possible to suppress a frequency component becoming noise by comparing synchronized information.

For example, a delay time occurs until the self-diagnosis information is converted and transferred to reach the abnormality judgment unit 114 through the self-diagnosis information conversion unit 120, the drive unit 160, the information output unit 170, the information detection unit 140, and the detection information conversion unit 130. It also becomes possible to synchronize and compare the self-diagnosis information and the detection information by the judgment timing determination unit 113 recognizing the delay time in advance. The judgment timing determination unit 113 acquires an output information signal indicating to which information output unit 170 the self-diagnosis control unit 112 has outputted the self-diagnosis information, and the self-diagnosis information outputted to the information output unit 170, from the self-diagnosis control unit 112. The judgment timing determination unit 113 reads a delay time corresponding to the information output unit 170 indicated by the output information signal, from the self-diagnosis information storage unit 152. In this way, the judgment timing determination unit 113 determines the delay time corresponding to the information output unit 170. The delay time until the self-diagnosis information is converted and transferred to reach the abnormality judgment unit 114 through the self-diagnosis information conversion unit 120, the drive unit 160, the information output unit 170, the information detection unit 140, and the detection information conversion unit 130 can be measured in advance by the self-diagnosis apparatus 100. The delay time measured in advance for each information output unit 170 can be stored by the self-diagnosis apparatus 100 in the self-diagnosis information storage unit 152 in association with the information output unit 170. Alternatively, a delay time that is computed in advance from the specifications defined for the self-diagnosis information conversion unit 120, the drive unit 160, the information output unit 170, the information detection unit 140, and the detection information conversion unit 130 can be stored by the self-diagnosis apparatus 100 in the self-diagnosis information storage unit 152.

It is also possible for the judgment timing determination unit 113 to use a value obtained by adding the delay time from the timing when the self-diagnosis information has been received from the self-diagnosis control unit 112 as a judgment initiation timing. In addition, it is also possible for the abnormality judgment unit 114 to use a value obtained by adding the delay time from the timing when reception of the self-diagnosis information has been ended from the self-diagnosis control unit 112 as a judgment ending timing. In the case where the self-diagnosis information is information in the form of pulse, the judgment timing determination unit 113 can be configured to set the judgment initiation timing and the judgment ending timing for each pulse. The judgment timing determination unit 113 is capable of outputting the above-mentioned judgment initiation timing and judgment ending timing to the abnormality judgment unit 114. In addition, the judgment timing determination unit 113 is also capable of determining a period from the judgment initiation timing to the judgment ending timing as a judgment window period (synchronization window period). In this case, the judgment timing determination unit 113 is also capable of outputting a judgment window-related signal indicating the judgment initiation timing and the judgment ending timing to the abnormality judgment unit 114.

The abnormality judgment unit 114 compares the self-diagnosis information and the detection information outputted from the information detection unit 140 associated with the information output unit 170 at a timing designated by the judgment timing determination unit 113. In the case where a difference between the self-diagnosis information and the detection information outputted from the information detection unit 140 is within a predetermined acceptable range or in the case where the self-diagnosis information coincides with the detection information, the abnormality judgment unit 114 judges that the information output unit 170 is operating normally. In addition, in the case where the difference between the self-diagnosis information and the detection information outputted from the information detection unit 140 exceeds the predetermined acceptable range, the abnormality judgment unit 114 judges that the information output unit 170 is not operating normally.

Note that the abnormality judgment unit 114 is capable of executing processing to optionally weight the detection information and the self-diagnosis information to be compared in the judgment window period. For example, it is possible to set the weighting at the beginning and end of the judgment window period to zero, and to increase values of the weighting near the center of the judgment window period. As one example, it is possible to weight the judgment window period by using any window function such as the hamming window. In this way, it becomes possible to reduce the effect due to deviation in timing before and after the start of judgment and timing before and after the end of judgment on the judgment by using an appropriate window function in the judgment window period. In addition, it becomes possible to improve the accuracy in abnormality judgment by using an appropriate window function in the judgment window period.

Note that in the case where the self-diagnosis information used for self-diagnosis of one information output unit 170 is composed of multiple pulses, the abnormality judgment unit 114 is capable of using intervals of the pulses in the self-diagnosis information and the detection information for the abnormality judgment. In the case where a result of comparison in intervals of the pulses exceeds a predetermined range, the abnormality judgment unit 114 is also capable of judging that the information output unit 170 is not operating normally. In addition, for example, in the case where the intervals of the pulses are equal intervals, and the pulses indicate a specific frequency, the abnormality judgment unit 114 is also capable of conducting frequency analysis by subjecting the detection information to FFT (fast Fourier transform) processing. In this case, in the case where a result of comparison in frequencies of the pulses exceeds a predetermined range, the abnormality judgment unit 114 is also capable of judging that the information output unit 170 is not operating normally.

In addition, there is a case where one pulse itself of the self-diagnosis information is composed of multiple signals having a specific frequency component. For example, in the case where the information output unit 170 is a speaker and the speaker is vibrated at 10 Hz for 0.5 seconds, and is thereafter vibrated multiple times at intervals of 0.5 seconds, a state in which the speaker is vibrated at 10 Hz for 0.5 seconds and is not vibrated for the next 0.5 seconds is repeated. One pulse of the self-diagnosis information in this case is composed of multiple signals having a signal component of 10 Hz. In addition, one pulse in 0.5 seconds of the detection information contains a signal component of 10 Hz. In these cases, the abnormality judgment unit 114 conducts the FFT analysis for each pulse. In the case where the frequency component of one pulse of the self-diagnosis information and the frequency component of one pulse of the detection information are compared, and a result of comparison in frequency exceeds a predetermined range, the abnormality judgment unit 114 is also capable of judging that the information output unit 170 is not operating normally. Note that in the case where there is a small amount of noise, it is also possible to compute the frequency from a duration of one pulse, or a duration of one signal component contained in one pulse. In addition, the abnormality judgment unit 114 is also capable of executing frequency analysis on a pulse train regarding one pulse as one signal such as a rectangular wave or sine wave, and judging that the information output unit 170 is not operating normally in the case where a result of comparison in frequency exceeds a predetermined range. This frequency analysis can also be executed by the abnormality judgment unit 114 through the FFT analysis or analysis on duration. Note that in the FFT analysis, the abnormality judgment unit 114 can use the above-mentioned window function.

When the abnormality judgment unit 114 judges that there is abnormality in the self-diagnosis subjected to any information output unit 170, the abnormality judgment unit 114 outputs, as abnormality information, identification information of the information output unit 170 judged to have abnormality, or the identification information and abnormality judgment information to a normal information output unit 170.

For example, in the case where the information output unit 170 is a speaker, identification information indicating the information output unit 170 judged to have abnormality, and information indicating that there is abnormality are broadcast. As an example, sound information such as "the speaker in the door on the right side of the driver's seat has failed. It is recommended to repair the speaker early." is broadcast from another speaker operating normally. In addition, similar information may be displayed on a display operating normally.

Note that in the case where the information output unit 170 subjected to the self-diagnosis is diagnosed to have abnormality, the abnormality judgment unit 114 stores the detection information on the judgment of abnormality in a detection information storage unit 153. Such a configuration makes it possible to reproduce the abnormality state of the information output unit 170 judged to have abnormality and to thus promptly repair the information output unit 170 in the case where the information output unit 170 judged to have abnormality is to be repaired in a repair shop or the like.

In addition, in the case where the information output unit 170 subjected to the self-diagnosis is diagnosed to be normal as well, the abnormality judgment unit 114 stores the detection information in the detection information storage unit 153. Then, in the case where there is previous detection information on the same information output unit 170, the abnormality judgment unit 114 can be configured to detect a time-series change in the detection information. In the case where it is possible to estimate when the information output unit 170 fails from the time-series change in the detection information of the target information output unit 170, the abnormality judgment unit 114 outputs information on prediction of failure of the target information output unit 170 in the future to a normal information output unit 170 as abnormality information. For example, the self-diagnosis apparatus 100 is capable of storing a deterioration curve of the target information output unit 170 in the detection information storage unit 153 in association with the identification information of the information output unit 170 in advance.

The self-diagnosis information conversion unit 120 executes an operation of converting the self-diagnosis information inputted from the self-diagnosis control unit 112 to an information format that can be outputted from the information output unit 170. For example, in the case where the information output unit 170 is a speaker, the self-diagnosis information conversion unit 120 is capable of operating as a D/A (digital-to-analog) converter. That is, the self-diagnosis information represented by a digital signal is converted to an analog signal for driving the speaker. Note that since the output of the D/A converter is a voltage, a voltage signal is converted to a current signal in the drive unit 160, which will be described later.

In addition, although there is a case where a sound signal pattern for broadcasting from a speaker in time-series is written in the self-diagnosis information, the present embodiments are not limited to embodiments in which the self-diagnosis information is obtained by digitalizing a pattern of information to be outputted from the information output unit 170. For example, in the self-diagnosis information, a frequency, an output level, and an output pattern may be written as text information. When the audible frequency of human is assumed to be from 20 Hz to 20 kHz, information of a frequency (10 Hz), a sound volume (40 dB), and an output pattern (an interval of 0.5 seconds, and a constant sound volume of 40 dB) may be written in the self-diagnosis information. In this case, the self-diagnosis information conversion unit 120 analyzes the information of a frequency (10 Hz), a sound volume (40 dB), and an output pattern (an interval of 0.5 seconds, and a constant sound volume of 40 dB), and generates a digital pattern of signals. In addition, the self-diagnosis information conversion unit 120 may include a configuration of D/A converting the digital pattern of signals thus generated.

In addition, for example, in the case where the information output unit 170 is an LED, the self-diagnosis information conversion unit 120 in some cases operates as a D/A converter as in the above-described case. That is, the self-diagnosis information represented by a digital signal is converted to an analog signal for obtaining a pattern of light to be emitted from the LED. Note that although the output of the D/A converter is a voltage, there is a case where a bias voltage for the LED to start light emission is added to the analog signal in the drive unit 160, which will be described later.

In addition, although there is a case where a light signal pattern for emitting light from the LED in time-series is written in the self-diagnosis information, the present embodiments are not limited to embodiments in which the self-diagnosis information is obtained by digitalizing an output pattern of information to be outputted from the information output unit 170. For example, in the self-diagnosis information, an output frequency, an output level, and an output pattern may be written as text information. For example, in the self-diagnosis information, information of an output frequency (1 kHz), brightness (20 millicandela), and an output pattern ((0.5 seconds, 20 millicandela), (0.5 seconds, 20 millicandela), and (0.5 seconds, 20 millicandela)) may be written. In this case, the self-diagnosis information conversion unit 120 may include a configuration of generating a digital pattern of signals satisfying the above-described information, and D/A converting the digital pattern of signals thus generated.

In addition, for example, in the case where the information output unit 170 is a fragrance emitting apparatus, the self-diagnosis information conversion unit can be configured to operate to extract the type of fragrance, the intensity of the fragrance, and the emission pattern of the fragrance, from the self-diagnosis information. Note that the intensity of fragrance may be determined based on the concentration of a fragrance component in the air or a predetermined amount of a fragrance component to be emitted in the air. In this case, a configuration in which the self-diagnosis information conversion unit 120 outputs the above-described extracted information to the drive unit 160, and the drive unit 160 converts the extracted information to a command, and the drive unit 160 outputs the command to the fragrance emitting apparatus is also possible.

The drive unit 160 executes drive processing such as amplification and conversion in order for the information output unit 170 to output information converted in the self-diagnosis information conversion unit 120. For example, in the case where the information output unit 170 is a speaker, the drive unit 160 executes an operation of amplifying current so that a sound wave emitted from the speaker reaches a level recognizable as a signal in the information detection unit 140. Note that the degree of amplification may be determined in advance by the self-diagnosis information.

For example, in the case where the information output unit 170 is a buzzer, the drive unit 160 executes an operation of amplifying voltage so that a sound wave emitted from the buzzer reaches a level recognizable as a signal in the information detection unit 140. Note that the degree of amplification may be determined in advance by the self-diagnosis information.

In addition, for example, in the case where the information output unit 170 is an LED, the drive unit 160 executes an operation of amplifying current so that a light emitted from the LED reaches a level recognizable as a signal in the information detection unit 140. The larger the current between an anode and a cathode, the higher the brightness of the light emitted from the LED and the larger the voltage obtained by photoelectric conversion in the information detection unit 140. Note that the degree of amplification may be determined in advance by the self-diagnosis information.

Moreover, for example, in the case where the information output unit 170 is an organic EL, the drive unit 160 executes an operation of amplifying voltage so that a light emitted from the organic EL reaches a level recognizable as a signal in the information detection unit 140. The larger the voltage between an anode and a cathode, the higher the brightness of the light emitted from the organic EL and the larger the voltage obtained by photoelectric conversion in the information detection unit 140. Note that the degree of amplification may be determined in advance by output self-diagnosis pattern information.

Moreover, for example, in the case where the information output unit 170 is a display using an LED or an organic EL, the drive unit 160 executes an operation of amplifying voltage so that a light emitted from the display reaches a level recognizable as a signal in the information detection unit 140. In addition, the drive unit 160 causes an LED or an organic EL having a desired color system included in pixels to emit light in an active matrix type or a simple matrix type. Note that the degree of amplification may be determined in advance by the self-diagnosis information.

Moreover, for example, in the case where the information output unit 170 is a fragrance emitting apparatus, the drive unit 160 executes an operation of adjusting the amount of fragrance to be emitted so that the fragrance emitted from the fragrance emitting apparatus reaches a level recognizable as a signal in the information detection unit 140. In addition, the drive unit 160 is also capable of determining the type of fragrance emitted from the fragrance emitting apparatus. Although these operations can be executed by using the aforementioned commands, for example, a configuration in which the drive unit 160 includes a selector and the like and determines the type of fragrance emitted from the fragrance emitting apparatus is also possible.

The information output unit 170 is configured to receive a drive signal optimized by the drive unit 160 and output information. Examples of the information output unit 170 include hearing information output apparatuses such as a speaker and a buzzer, sight information output apparatuses such as an LED, an organic EL, and a display, fragrance emitting apparatuses that emit fragrance, and the like. Note that the number of the information output unit 170 is not limited to one, and any number of the information output units 170 can be installed. In addition, the information output unit 170, which outputs alert such as warning, is normally provided in a vehicle body; however, for example, in the case of moving means with which equipment involving extension of human functions is equipped, the information output unit 170 may be installed in such equipment. In this case, the equipment and the moving means are connected through wireless communications.

The information detection unit 140 is configured to be capable of detecting output information of the information output unit 170. Hence, the information detection unit 140 is determined in accordance with the type of the information output unit 170. For example, in the case where the information output unit 170 is a hearing information output apparatus such as a speaker or a buzzer, the information detection unit 140 is a hearing information detection apparatus or a vibration information input apparatus.

Specifically, in the case where the information output unit 170 is a hearing information output apparatus such as a speaker or a buzzer, the information detection unit 140 is a hearing information detection apparatus such as a microphone or a vibration information input apparatus such as an acceleration sensor. In the case where the information detection unit 140 is a hearing information detection apparatus such as a microphone, there is a case where one hearing information detection apparatus such as a microphone may be installed for multiple hearing information output apparatuses such as speakers or buzzers. This is because one hearing information detection apparatus such as a microphone is capable of identifying and detecting hearing information from multiple hearing information output apparatuses for each apparatus while changing the timing or frequency. However, an input frequency band of the hearing information detection apparatus needs to contain a frequency band of outputted hearing information. Such a configuration makes it possible to reduce the number of the hearing information detection apparatuses, and to thus reduce the construction cost of the entire system.

In addition, in the case where the information detection unit 140 is a vibration information input apparatus such as an acceleration sensor, it is preferable that the information output unit 170 and the information detection unit 140 be coupled indirectly through a vibration transmission medium, or directly. For example, the vibration transmission medium is preferably a medium having a rigidity and being capable of favorably transmitting vibration such as a metal. However, in the case where the information output unit 170 and the information detection unit 140 are capable of favorably transmitting vibration through the air, they do not need to be coupled indirectly through a vibration transmission medium, or directly. The case where vibration can be favorably transmitted means the case where a predetermined SN ratio is satisfied, which is a state where a vibration component of the information output unit 170 can be extracted.

In addition, for example, in the case where the information output unit 170 is a sight information output apparatus such as an LED, an organic LED, or a display, the information detection unit 140 is a sight information detection apparatus such as a photodiode or a phototransistor. It is preferable that a so-called line of sight be provided between the sight information output apparatus and the sight information detection apparatus. There is a case where one sight information detection apparatus such as a photodiode or a phototransistor may be installed for multiple sight information output apparatuses such as LEDs or organic LEDs. This is because one sight information detection apparatus is capable of identifying and detecting light, which is sight information, from multiple sight information output apparatuses for each apparatus while changing the timing and wavelength. However, a wavelength band of the sight information detection apparatus needs to contain a wavelength band of light, which is outputted sight information. Such a configuration makes it possible to reduce the number of the sight information detection apparatuses, and to thus reduce the construction cost of the entire system. Light, which is sight information, can also be propagated from the sight information output apparatus to the sight information detection apparatus through a reflector having a mirror surface such as a reflective mirror or an optical propagation medium such as an optical fiber, which is not shown.

In addition, for example, in the case where the information output unit 170 is a sight information output apparatus such as a liquid-crystal display or an organic EL display, a sight information detection apparatus such as a photodiode or a phototransistor may be provided corresponding to a region of part of the display screen. For example, it is preferable to comprise a sight information detection apparatus in which a light emission wavelength in the case where sight information is displayed is contained in a light reception wavelength band in at least one of sides and corners of the periphery of the display screen of the sight information output apparatus. In this case, it is possible to consider the sight information output apparatus as having been subjected to self-diagnosis by conducting self-diagnosis on some light-emitting elements of the sight information output apparatus adjacent to the sight information detection apparatus provided in a side or a corner. In the case where the sight information output apparatus is a color display, it is also possible to conduct self-diagnosis on the sight information output apparatus by blinking or turning on the light-emitting elements of red-based color, blue-based color, or green-based color. Such a configuration makes it possible to execute the self-diagnosis processing without allowing the user to easily visually recognize the processing in some cases.

In addition, in the case where the sight information output apparatus is a color display, for example, it is also possible to conduct self-diagnosis on the sight information output apparatus by blinking or turning on one of, or a color obtained by combining, red-based color, blue-based color, or green-based color on the display screen of the sight information output apparatus. For example, light sources are blinked or turned on in order in a direction separating from the sight information detection apparatus or in a direction approaching the sight information detection apparatus. As a specific example, the light-emitting elements are turned on in order from a periphery to a center of the display screen or from the center toward the periphery. In this case, it becomes possible to judge the abnormality of the sight information output apparatus by judging whether or not an output intensity pattern of the sight information detection apparatus is similar to an input pattern to the sight information output apparatus. This sequence is preferably executed in order by using one of, or a color obtained by combining, red-based color, blue-based color, and green-based color.

In addition, for example, in the case where the information output unit 170 is a fragrance emitting apparatus which emits fragrance, the information detection unit 140 is a smell information input apparatus such as a fragrance detection sensor. An example of a fragrance detection sensor includes a sensor configured by providing sensitive membranes of one or more types on a MEMS (Micro-Electro-Mechanical Systems) sensor array to utilize the properties that electrical resistances changes due to strain of the sensitive membranes. In addition, a sensor may be configured to specify fragrance from a change pattern of electrical resistances of sensitive membranes of one or more types.

The detection information conversion unit 130 may be an A/D (Analog-to-digital) converter which converts detection information to a digital signal as necessary. In addition, as mentioned above, the detection information conversion unit 130 may be included in the information detection unit 140 or the abnormality judgment unit 114 in some cases.

The storage unit 150 is a computer-readable storage medium. For example, the storage unit 150 may be a ROM (Read Only Memory) or an EPROM (Erasable Programmable ROM). Alternatively, the storage unit 150 may be an EEPROM (Electrically Erasable Programmable ROM), a RAM (Random Access Memory), a hard disk, or the like. The storage unit 150 may be called a register, a cache, a main memory (a main storage apparatus), or the like. The storage unit 150 can store programs (program codes), software modules, and the like that can be executed to implement the self-diagnosis according to the embodiments of the present disclosure.

Note that the storage unit 150 comprises the parameter information storage unit 151, the self-diagnosis information storage unit 152, and the detection information storage unit 153.

The parameter information storage unit 151 stores in advance information on various window functions, information on the timing to initiate the self-diagnosis processing, information on the version, manufacturing date, identification information of the self-diagnosis apparatus 100, and the like.

The self-diagnosis information stored in the self-diagnosis information storage unit 152 is output pattern information expected to be outputted for the self-diagnosis by the information output unit 170. In addition, as mentioned above, the self-diagnosis information storage unit 152 can store in advance identification information of the information output unit 170 connected to the self-diagnosis apparatus 100 in association with the self-diagnosis information. Moreover, the self-diagnosis information storage unit 152 stores accumulated time of use of the information output unit 170 and can store the MTBF of the information output unit 170 in advance. The information on MTBF can be stored in the self-diagnosis information storage unit 152 when the self-diagnosis system including the self-diagnosis apparatus 100 is manufactured or maintained, or in other situations. Note that since the detail of the self-diagnosis information has been mentioned above, the description thereof is omitted for avoiding repetition.

The detection information storage unit 153 stores detection information that the information detection unit 140 has detected information outputted from the information output unit 170 corresponding to the self-diagnosis information, in association with the time of the detection and the identification information of the information output unit 170. In addition, a deterioration curve by output information of the information output unit 170 may be stored in advance as necessary. The deterioration curve may be information that contains information on a deterioration rate of the intensity of the output information, a deterioration rate of the response speed of the output information, and the like, and that is used for predicting a failure of the information output unit 170.

The self-diagnosis apparatus 100 according to the embodiments may further comprise a transmission unit, which is not shown, that transmits abnormality information to an outside wirelessly or with wire. The transmission unit can transmit abnormality information to an external electronic apparatus wirelessly through so-called mobile communications. Alternatively, the transmission unit may conduct wireless communications based on at least one near field communications standard of a wireless LAN and Bluetooth (registered trademark). Alternatively, the transmission unit may conduct communications with an outside through connection using a cable (for example, an USB cable or an optical cable). Such a configuration makes it possible to notify the user of a message that prompts repair via a normal information output unit 170 from an external electronic apparatus in the case where the user has not voluntarily repaired an information output unit 170 in which abnormality has occurred during an appropriate period.

The transmission destination of the transmission unit may be, for example, an electronic apparatus used by a user, such as a computer arranged on a cloud, or a cellular phone, a PHS phone, a smartphone, or a portable information terminal carried by the user. In addition, abnormality information may be configured to be outputted in the case where the user has accessed the computer or the electronic apparatus. Such a configuration makes it possible for a user to recognize again that there is an information output unit 170 that needs repair when accessing an electronic apparatus used by the user after the user ends the operation of a mobile body, for example.

The above-described configurations make it possible to provide a self-diagnosis apparatus and a self-diagnosis system that diagnose, at an appropriate timing, whether or not an information output unit 170 can output information normally when the information output unit 170 needs to output the information. In addition, even in the case where an information output unit 170 cannot be repaired immediately, the user can recognize again that the information output unit 170 needs repair when accessing an external computer or an electronic apparatus used by the user, thus enabling the user to be prevented from accidentally forgetting this, and the like.

(Example of Operation of Self-Diagnosis Apparatus and Self-Diagnosis System)

Figure 3:
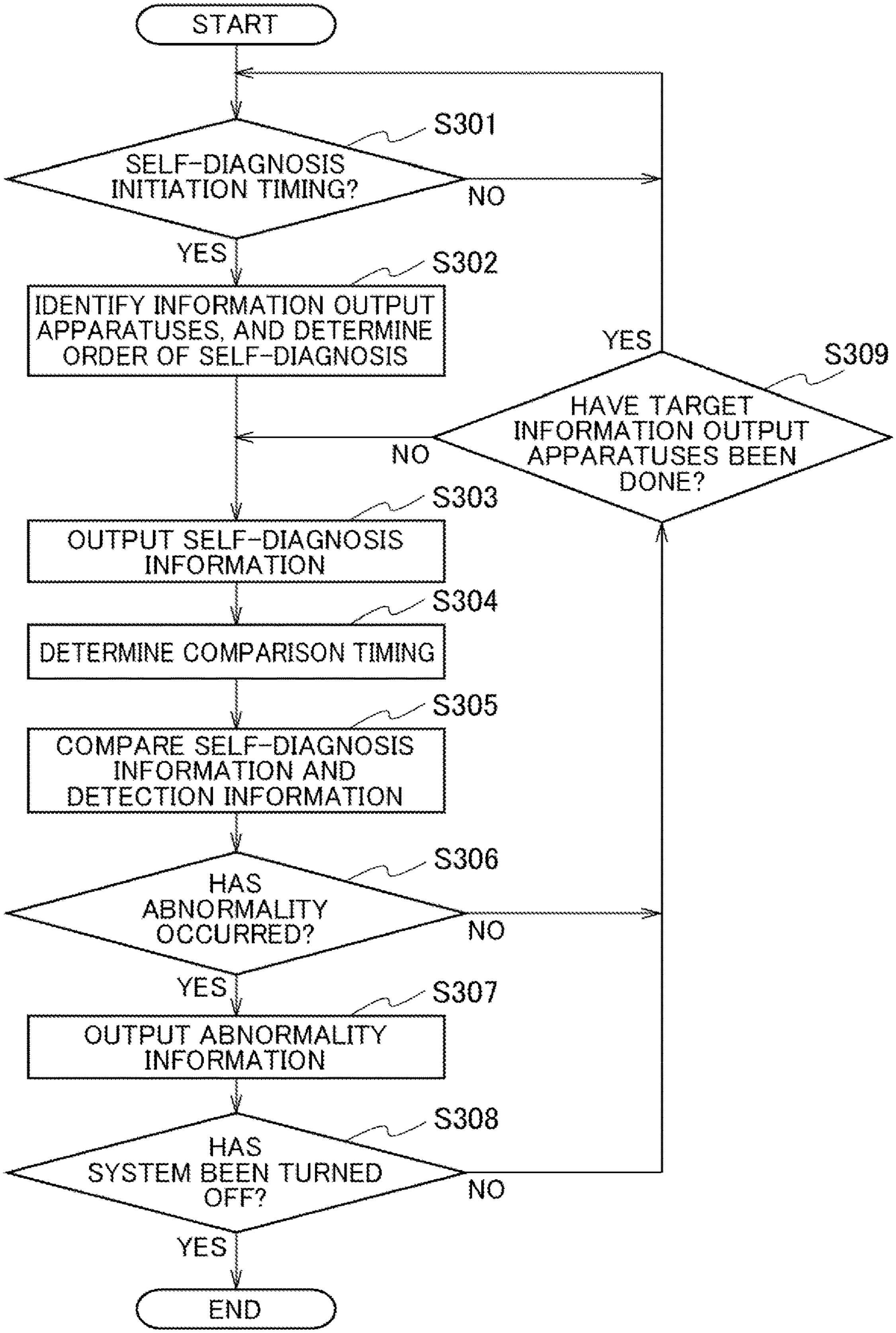
FIG. 3 is a flowchart showing an example of a self-diagnosis method using the self-diagnosis apparatus shown in FIG. 2.

Next, an example of the operation of the self-diagnosis apparatus 100 and the self-diagnosis system 400 shown in FIG. 1 will be described using a flowchart with reference to FIG. 3.

In step S301, the self-diagnosis initiation detection unit 111 detects whether or not the timing to initiate the self-diagnosis has come. Since the detail of the timing to initiate the self-diagnosis has been mentioned above, the description thereof is omitted. If the timing to initiate the self-diagnosis has come (step S301: YES), the self-diagnosis apparatus 100 proceeds to step S302. If the timing to initiate the self-diagnosis has not come (step S301: NO), the self-diagnosis apparatus 100 repeats step S301.

In step S302, the self-diagnosis control unit 112 which has received a self-diagnosis initiation signal from the self-diagnosis initiation detection unit 111 executes the following processing. In the case where identification information of an information output unit 170 is contained in the self-diagnosis initiation signal, the self-diagnosis control unit 112 reads, from the self-diagnosis information storage unit 152, self-diagnosis information of the information output unit 170 indicated by the identification information. In addition, in the case where identification information of an information output unit 170 is not contained in the self-diagnosis initiation signal, the self-diagnosis control unit 112 reads, from the self-diagnosis information storage unit 152, self-diagnosis information in order from an information output unit 170 having a large accumulated time of use or in order from an information output unit 170 having a small MTBF. For information output units 170 having the same accumulated time of use/MTBF, it is preferable to execute self-diagnosis processing from an information output unit 170 having a small MTBF; however, the order of self-diagnosis processing may be determined in advance such as prioritizing an information output unit 170 having a high frequency of use. Note that the order to execute self-diagnosis can be determined in advance by the self-diagnosis apparatus 100. Next, the self-diagnosis apparatus 100 proceeds to step S303.

In step S303, the self-diagnosis control unit 112 outputs the self-diagnosis information thus read to the self-diagnosis information conversion unit 120. The self-diagnosis information is outputted to the information output unit 170 to be subjected to self-diagnosis from the drive unit 160 to be subjected to self-diagnosis via the self-diagnosis information conversion unit 120. In the case where information corresponding to self-diagnosis information is outputted from the information output unit 170 as output information, the information detection unit 140 detects this output information and outputs the output information as detection information. In addition, the detection information is converted to a digital signal in the detection information conversion unit 130 as necessary. Next, the self-diagnosis apparatus 100 proceeds to step S304.

In step S304, the judgment timing determination unit 113 determines the timing to compare the self-diagnosis information and the detection information in the abnormality judgment unit 114. In the case where the self-diagnosis information is a pulse pattern, the judgment timing determination unit 113 determines the timing such that comparison processing is executed in the abnormality judgment unit 114 at the timing corresponding to the pulse pattern, and outputs the timing thus determined to the abnormality judgment unit 114. For example, the judgment timing determination unit 113 can output a rectangular wave window of a timing corresponding to a pulse to the abnormality judgment unit 114. In addition, the judgment timing determination unit 113 can also notify the abnormality judgment unit 114 of an initiation timing and an end timing of the self-diagnosis information in consideration of a delay time of a signal transmission system for each information output unit 170. Next, the self-diagnosis apparatus 100 proceeds to step S305.

In step S305, the abnormality judgment unit 114 compares the self-diagnosis information and the detection information, and generates abnormality information if there is abnormality in the drive unit 160 and the information output unit 170 subjected to the self-diagnosis. The abnormality judgment unit 114 determines time, duration, and weighting for comparison processing from the timing and the pattern of the self-diagnosis information received from the judgment timing determination unit 113. In the case where the self-diagnosis information is such that a specific frequency and the magnitude of the specific frequency have meanings, the judgment timing determination unit 113 executes a frequency analysis such as FFT between an initiation timing and an end timing for execution of comparison processing in such a manner as to specify the specific frequency. If the initiation timing and the end timing for execution of the comparison processing coincide with an information output initiation timing and an information output end timing of the information output unit 170, the abnormality judgment unit 114 can accurately specify the specific frequency. In addition, by weighting with a window function between the initiation timing and the end timing for execution of the comparison processing, it becomes possible to reduce an error in the specific frequency due to deviation in timing. In addition, the specific frequency can be compared by using a digital comparator. Moreover, there is a case where there are multiple pulses having a specific frequency, and the multiple pulses are expressed by frequencies different from the specific frequency. In this case, the abnormality judgment unit 114 can also execute FFT processing on the multiple pulses or calculation processing of time intervals of the pulses to execute the comparison processing. Since the detail has been described above, the description is omitted. If a difference between the self-diagnosis information and the detection information exceeds a predetermined range, the abnormality judgment unit 114 generates abnormality information. Note that the abnormality judgment unit 114 stores the detection information in the detection information storage unit 153 in association with the identification information of the information output unit 170 on which the self-diagnosis has been executed and time information at which the comparison processing has been executed. Next, the self-diagnosis apparatus 100 proceeds to step S306.

In step S306, the abnormality judgment unit 114 proceeds to step S307 if the abnormality judgment unit 114 has generated the abnormality information (step S306: YES). The abnormality judgment unit 114 proceeds to step S309 if the abnormality judgment unit 114 has not generated the abnormality information (step S306: NO).

In step S307, the abnormality judgment unit 114 outputs the generated abnormality information to an information output unit 170 which has already been subjected to the self-diagnosis processing and judged to operate normally. If no information output unit 170 which operates normally is found, the self-diagnosis apparatus 100 may execute processing to find out an information output unit 170 which operates normally. In addition, the self-diagnosis apparatus 100 can also wirelessly output the generated abnormality information to an external computer or an electronic apparatus carried by a user and used by the user. Next, the self-diagnosis apparatus 100 proceeds to step S308.

In step S308, the self-diagnosis initiation detection unit 111 judges whether or not the electronic control apparatus including the self-diagnosis apparatus 100 has been turned off. If the electronic control apparatus has been turned off (step S308: YES), the self-diagnosis apparatus 100 ends the self-diagnosis processing. If the electronic control apparatus has not been turned off (step S308: NO), the self-diagnosis apparatus 100 proceeds to step S309.

In step S309, the self-diagnosis apparatus 100 judges whether or not there is a remaining information output unit 170 which needs to be continuously subjected to the self-diagnosis. If there is no remaining information output unit 170 which needs to be continuously subjected to the self-diagnosis (step S309: YES), the self-diagnosis apparatus 100 returns to step S301. If there is a remaining information output unit 170 which needs to be continuously subjected to the self-diagnosis (step S309: NO), the self-diagnosis apparatus 100 proceeds to step S303.

The above-described processing makes it possible to provide a self-diagnosis apparatus and a self-diagnosis system that diagnose, at an appropriate timing, whether or not an information output unit 170 can output information normally when the information output unit 170 needs to output the information. In addition, even in the case where an information output unit 170 cannot be repaired immediately, the user can recognize again that the information output unit 170 needs repair from an external computer or an electronic apparatus used by the user, thus enabling the user to be prevented from accidentally forgetting this, and the like.

(Examples of Arrangement of Information Output Unit and Information Detection Unit)

Figure 4A:
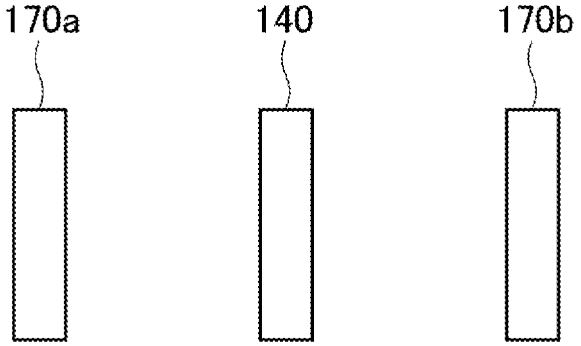
FIG. 4A is a schematic diagram showing an example of an arrangement relation of information output units and an information detection unit.
Figure 4B:
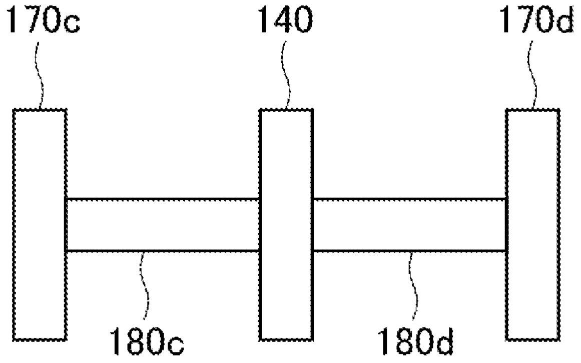
FIG. 4B is a schematic diagram showing another example of an arrangement relation of information output units and an information detection unit.
Figure 4C:
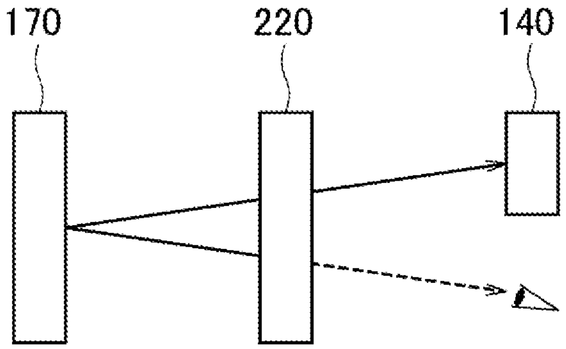
FIG. 4C is a schematic diagram showing still another example of an arrangement relation of an information output unit and an information detection unit.

FIG. 4A, FIG. 4B, and FIG. 4C are schematic diagrams showing examples of arrangement of the information output unit 170 and the information detection unit 140.

FIG. 4A is an example in the case where the information output unit 170 is an apparatus that outputs hearing information such as a speaker, where one information detection unit 140 that is a sound collecting apparatus such as a microphone is arranged for two information output units 170. If output information of a first speaker 170*a* and output information of a second speaker 170*b* are outputted at temporally different times, or if frequency components of the output information are different, it is possible to output detection information with one information detection unit 140 such as a microphone.

FIG. 4B is an example in the case where the information output unit 170 is an apparatus that outputs hearing information such as a speaker, where one information detection unit 140 such as an acceleration sensor is arranged for two information output units 170. A third speaker 170*c* and the acceleration sensor are connected via a first vibration transmission medium 180*c* such as a metal. In addition, a fourth speaker 170*d* and the acceleration sensor are connected via a second vibration transmission medium 180*d* such as a metal. The first vibration transmission medium 180*c* and the second vibration transmission medium 180*d* are collectively referred to as vibration transmission media in some cases. Since the frequency components outputted from the speakers are efficiently transmitted to the information detection unit 140, the above-described configuration makes it possible to improve the SN ratio. If output information of the third speaker 170*c* and output information of the fourth speaker 170*d* are outputted at temporally different times, or if frequency components of the output information are different, it is possible to output detection information with one information detection unit 140 such as an acceleration sensor.

FIG. 4C is a schematic diagram in the case where the information output unit 170 is an apparatus that outputs sight information such as a light source, where a light adjustment apparatus 220 is arranged between the information output unit 170 and the information detection unit 140 and a line of sight of a user. In the case where the information output unit 170 is to be subjected to the self-diagnosis processing, transmittance of the light adjustment apparatus 220 is lowered, while in the case where the information output unit 170 is not to be subjected to the self-diagnosis processing, the transmittance of the light adjustment apparatus 220 is raised. Such a configuration makes it possible to also execute self-diagnosis processing such that the user does not notice the self-diagnosis processing. Note that in the case where the information output unit 170 is a display, it is also possible to attach a light adjustment apparatus 220 such that the light adjustment apparatus 220 covers a front face of the display.

(Specific Example of Case Comprising Transmission Unit)

Figure 5:
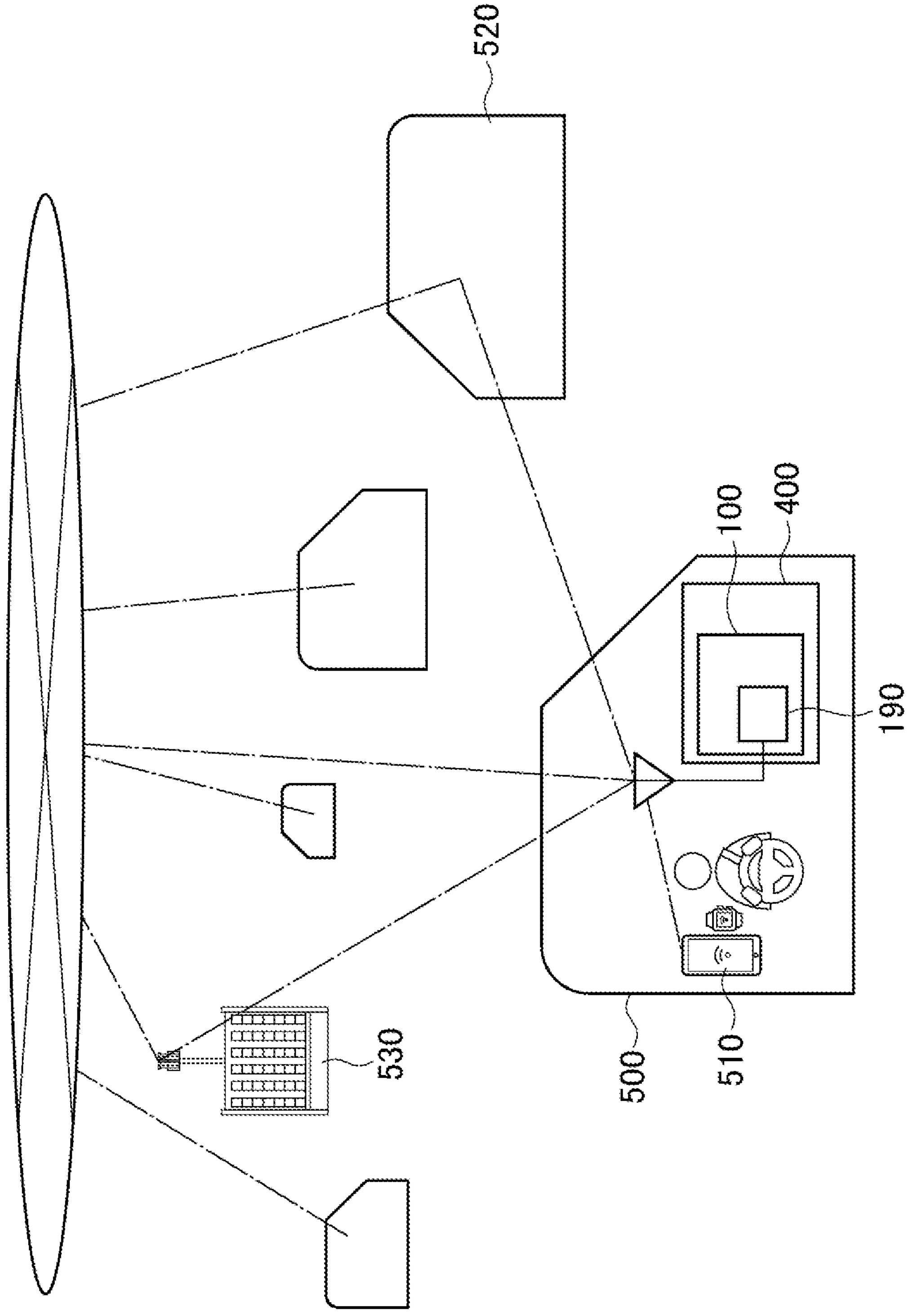
FIG. 5 is a diagram for describing a network configuration including a self-diagnosis system in a case of comprising a transmission unit.

Although in the above-described embodiments, the transmission unit has not been specifically shown in the drawings, FIG. 5 shows a network configuration including a self-diagnosis system in the case of comprising a transmission unit. As shown in FIG. 5, a self-diagnosis system 400 is mounted on a mobile body 500, which is a control target, and comprises a self-diagnosis apparatus 100. The self-diagnosis apparatus 100 further comprises a transmission unit 190.

The transmission unit 190 can communicate with an outside of the self-diagnosis system 400 through so-called mobile communications, and can transmit abnormality information to an external electronic apparatus. In addition, the transmission unit 190 can also perform wireless communications based on a near field communications standard such as a wireless LAN or Bluetooth (registered trademark).

The mobile body 500 may be, besides a normal vehicle, transportation mean (a taxi, a bus, a train, a sharing car, or the like) used in MaaS (Mobility as a Service). Moreover, the mobile body 500 may be a mobile body (a vehicle, a bicycle, or a motorbike) of a business operator which conducts a last-one-mile delivery in delivery of a package, or may be a mobile body such as a senior car used by elderly people or an automated transportation vehicle which moves within a factory.

In the case where the abnormality judgment unit 114 judges that there is abnormality in the information output unit 170 from the self-diagnosis, the abnormality judgment unit 114 may output abnormality information to an information output unit 170 judged to operate normally and transmit the abnormality information to an outside of the self-diagnosis system 400 via the transmission unit 190. In particular, in the case where an information output unit 170 that operates normally is not found, the abnormality judgment unit 114 transmits the abnormality information to an outside of the self-diagnosis system 400 via the transmission unit 190.

For example, the case where the self-diagnosis system 400 is mounted on a mobile body (a vehicle) 500 of a business operator that conducts a last-one-mile delivery will be described. When judging that there is abnormality in an information output unit 170 from self-diagnosis, the abnormality judgment unit 114 transmits abnormality information to a portable terminal (a smartphone or a smart watch) 510 of a user who is in the mobile body 500 via the transmission unit 190. In addition, the abnormality judgment unit 114 can also transmit the abnormality information to a mobile body (a vehicle, a bicycle, or a motorbike) 520 of the same business operator which is traveling around the mobile body 500 by conducting inter-vehicle communications via the transmission unit 190. Moreover, the abnormality judgment unit 114 may transmit the abnormality information to a management center 530 which conducts operation management of the business operator.

By transmitting abnormality information to an outside of the self-diagnosis system 400 in this way, the user or other delivery operators can be notified of and recognize the abnormality of the information output unit 170 even in the case where there is no information output unit 170 that operates normally. In particular, if another mobile body 520 or the management center 530 of the delivery operator can be notified of the abnormality of the mobile body 500, it becomes possible for the other mobile body 520 to carry packages loaded in the mobile body 500 as a substitute, thus improving the transportation efficiency.

Features and Advantageous Effects of Embodiments

Hereinafter, features and advantageous effects of the self-diagnosis apparatus 100 and the self-diagnosis system 400 according to the present embodiments will be described.

A self-diagnosis apparatus 100 according to a first aspect of the present disclosure conducts self-diagnosis on the information output unit 170 that outputs at least one information of control information on a control target 10 electronically controlled by an electronic control apparatus 200 or information demanded by a user who uses the control target 10. It is preferable that the self-diagnosis apparatus 100 comprise: a self-diagnosis control unit 112 that outputs a predetermined self-diagnosis information to the information output unit 170; and an information detection unit 140 that outputs a result of detection of output information outputted from the information output unit 170 in accordance with the self-diagnosis information as detection information. In addition, it is preferable that the self-diagnosis apparatus 100 comprise: an abnormality judgment unit 114 that compares the self-diagnosis information and the detection information during a predetermined synchronization window period, and in a case where difference information of a result of the comparison exceeds predetermined range information, judges that there is abnormality in the information output unit 170 and outputs abnormality information.

According to the above-described configuration, it becomes possible to diagnose, at an appropriate timing in advance, whether or not the information output unit can output information normally when the information output unit needs to output the information.

It is preferable that the self-diagnosis apparatus 100 according to a second aspect of the present disclosure further comprise: a judgment timing determination unit 113. It is preferable that the judgment timing determination unit 113 determine, in advance, a timing to initiate the synchronization window period in synchronization with a timing when the self-diagnosis information is outputted from the self-diagnosis control unit 112, the detection information is inputted to the abnormality judgment unit 114, and the abnormality judgment unit 114 initiates the comparison.

According to the above-described configuration, since it becomes possible to synchronize and compare the self-diagnosis information and the detection information, it is possible to suppress occurrence of temporal deviation of comparison targets. Hence, for example, in the case where the self-diagnosis information and the detection information each contain frequency information and the frequency information is to be compared, it is possible to adequately extract frequency components to be compared. Since the initiation timings of the self-diagnosis information and the detection information can be made to coincide, it is possible to improve the accuracy in abnormality judgment.

It is preferable that in the self-diagnosis apparatus 100 according to a third aspect of the present disclosure, weighting of the self-diagnosis information and the detection information which are compared at start and end of the synchronization window period be smaller than weighting of the self-diagnosis information and the detection information which are compared at a center portion of the synchronization window period.

According to the above-described configuration, it becomes possible to reduce effects associated with deviation improve the accuracy in abnormality judgment even when some deviation occurs in the initiation timings and the end timings of the self-diagnosis information and the detection information to be compared.

It is preferable that in the self-diagnosis apparatus 100 according to a fourth aspect of the present disclosure, the predetermined range information be an effective range of the detection information which is generated by a variation present between pattern information indicated by the self-diagnosis information and pattern information indicated by the detection information. In addition, it is preferable that the variation be a variation from a theoretical value under specific conditions of the property of a transmission system between the self-diagnosis information and the obtained detection information.

According to the above-described configuration, it becomes possible to reduce a probability that the transmission system of the information output unit 170 is erroneously judged to be abnormal in the case where the detection information to be compared is information from the information output unit 170 that operates normally.

It is preferable that the self-diagnosis apparatus 100 according to a fifth aspect of the present disclosure further comprise: a self-diagnosis initiation detection unit 111 that outputs a self-diagnosis initiation signal instructing the self-diagnosis control unit 112 to output the self-diagnosis information. It is preferable that the self-diagnosis initiation detection unit 111 output the self-diagnosis initiation signal to the self-diagnosis control unit at a predetermined timing.

According to the above-described configuration, it becomes possible to diagnose, at an appropriate timing in advance, whether or not the information output unit 170 can output information normally when the information output unit needs to output the information.

It is preferable that in the self-diagnosis apparatus 100 according to a sixth aspect of the present disclosure, the self-diagnosis initiation detection unit 111 output the self-diagnosis initiation signal to the self-diagnosis control unit 112 at a timing when the electronic control apparatus 200 and the self-diagnosis apparatus 100 are powered on.

According to the above-described configuration, since it becomes possible to execute the self-diagnosis processing when the electronic control apparatus 200 and the self-diagnosis apparatus 100 are powered on, it is possible to appropriately execute the self-diagnosis processing before the user implements necessary operations and the like.

It is preferable that the self-diagnosis apparatus 100 according to a seventh aspect of the present disclosure conduct the self-diagnosis processing at least one of a timing before start of initialization processing of the electronic control apparatus 200, a timing in a middle of the initialization processing, and a timing immediately after end of the initialization processing when the electronic control apparatus 200 and the self-diagnosis apparatus 100 are powered on.

According to the above-described configuration, since it becomes possible to execute the self-diagnosis processing when the electronic control apparatus 200 and the self-diagnosis apparatus 100 are initialized, it is possible to appropriately execute the self-diagnosis processing before the user implements necessary operations and the like.

It is preferable that in the self-diagnosis apparatus 100 according to an eighth aspect of the present disclosure, while information is outputted from the information output unit 170, self-diagnosis processing on another information output unit 170 be executed. That is, it is preferable that while information is outputted from the information output unit 170, the self-diagnosis initiation detection unit 111 output the self-diagnosis initiation signal to the self-diagnosis control unit 112.

According to the above-described configuration, since the self-diagnosis processing can be executed at a timing when information such as control information on the control target is outputted, it is possible to execute the self-diagnosis processing while the user does not pay attention to the information output unit 170 to be subjected to the self-diagnosis.

It is preferable that in the self-diagnosis apparatus 100 according to a ninth aspect of the present disclosure, before output processing in which information on control of the control target 10 or information demanded by the user is outputted from the information output unit 170, the self-diagnosis processing on the information output unit be executed That is, it is preferable that before the above-described information is outputted from the information output unit 170, the self-diagnosis initiation detection unit 111 output the self-diagnosis initiation signal to the self-diagnosis control unit 112.

According to the above-described configuration, since the self-diagnosis is surely executed before use of the information output unit 170, in the case where there is abnormality in an output system that uses the information output unit 170, it is possible for the user to recognize the abnormality at an appropriate timing.

It is preferable that the self-diagnosis apparatus 100 according to a tenth aspect of the present disclosure execute the following processing in a case where a noise component of the detection information is equal to or more than a predetermined value. That is, it is preferable that the self-diagnosis processing be not executed in a case where a noise component outputted from the information detection unit 140 when the self-diagnosis information is not outputted, relative to a signal component of the detection information detected in accordance with the self-diagnosis information, is equal to or more than a predetermined value. That is, it is preferable that in the above-described case, the self-diagnosis initiation detection unit 111 do not output the self-diagnosis initiation signal to the self-diagnosis control unit 112.

According to the above-described configuration, with such a control that self-diagnosis processing is not executed in a case where a noise component of the detection information is equal to or more than a predetermined value, it becomes possible to appropriately judge whether or not there is abnormality in an output system of the information output unit 170.

It is preferable that in the self-diagnosis apparatus 100 according to an eleventh aspect of the present disclosure, in a case where an amount of change in sensor information outputted from a sensor unit 210 in the control target controlled by the electronic control apparatus 200 exceeds a predetermined range, the self-diagnosis initiation detection unit 111 does not output the self-diagnosis initiation signal to the self-diagnosis control unit 112.

According to the above-described configuration, it becomes possible to prompt the user to execute an appropriate operation by not executing self-diagnosis processing so as not to output abnormality information in accordance with the self-diagnosis processing in a case where a situation to which the user should pay attention has occurred.

It is preferable that in the self-diagnosis apparatus 100 according to a twelfth aspect of the present disclosure, in a case where the control target 10 is a vehicle, upon receipt of sensor information indicating that the vehicle is turning a winding road or a corner road, or sensor information indicating that the vehicle has approached an intersection, the self-diagnosis initiation detection unit 111 do not output the self-diagnosis initiation signal to the self-diagnosis control unit 112.

According to the above-described configuration, it becomes possible to prompt the user to execute an appropriate drive by not executing self-diagnosis processing so as not to output abnormality information in accordance with the self-diagnosis processing in a case where a situation to which the user should pay attention has occurred.

It is preferable that in the self-diagnosis apparatus 100 according to a thirteenth aspect of the present disclosure, the self-diagnosis information be information processed such that the output information of the information output unit 170 is not perceived by the user.

According to the above-described configuration, since the self-diagnosis processing of the self-diagnosis apparatus 100 can be executed without being perceived by the user, it becomes possible for the self-diagnosis apparatus 100 to execute the self-diagnosis processing at any appropriate timing.

It is preferable that the self-diagnosis apparatus 100 according to a fourteenth aspect of the present disclosure, in a case where the information output unit 170 is a device or the like that outputs hearing information, the self-diagnosis information be information instructing the information output unit 170 to output a frequency lower or higher than an audible frequency band of human.

According to the above-described configuration, since the self-diagnosis processing of the self-diagnosis apparatus 100 can be executed without being heard by the user, it becomes possible for the self-diagnosis apparatus 100 to execute the self-diagnosis processing at any appropriate timing.

It is preferable that the self-diagnosis apparatus 100 according to a fifteenth aspect of the present disclosure, in a case where the information output unit 170 is a device or the like that outputs sight information, the self-diagnosis information be information instructing the information output unit to output light of a wavelength of at least part of light of a wavelength band contained in the sight information.

According to the above-described configuration, since it is difficult to make the wavelength of light of the light source outside the visible light wavelength band in some cases depending on the type of a light source, it becomes possible to execute the self-diagnosis processing which is difficult for the user to perceive by using light having a relatively low luminosity factor among wavelengths of light of light sources.

It is preferable that in the self-diagnosis apparatus 100 according to a sixteenth aspect of the present disclosure, the self-diagnosis information be information processed such that light is outputted in a form of pulse and processed and has such brightness that the light is not perceived by the user.

According to the above-described configuration, it becomes possible to lower execution brightness by outputting light in a form of pulse, facilitating the adjustment in brightness of the light source and making it possible to use light that is not perceived by the user in the self-diagnosis processing.

It is preferable that in the self-diagnosis apparatus 100 according to a seventeenth aspect of the present disclosure, in a case where the information output unit 170 is a device or the like that outputs sight information, a light adjustment apparatus 220 be provided in a line of sight between the information output unit 170 and the user. It is preferable that during the self-diagnosis processing, light transmittance of the light adjustment apparatus 220 be lowered, while in a case other than during the self-diagnosis processing, the light transmittance of the light adjustment apparatus 220 be raised.

According to the above-described configuration, since the self-diagnosis processing can be executed without being perceived by the user, it becomes possible to judge whether or not there is abnormality in an output system of the information output unit 170 without disturbing the attention of the user.

It is preferable that in the self-diagnosis apparatus 100 according to an eighteenth aspect of the present disclosure, in a case where the information output unit 170 is a device or the like that outputs hearing information, the information detection unit 140 be a sound collecting device or the like. In this case, it is preferable that hearing information outputted from a plurality of the information output units 170 be detected by one of the information detection unit 140.

According to the above-described configuration, since it becomes possible to detect hearing information outputted from a plurality of information output units 170 by using one information detection unit 140, the freedom in arrangement is improved by reducing the number of information detection units 140, making it possible to reduce the cost.

It is preferable that in the self-diagnosis apparatus 100 according to a nineteenth aspect of the present disclosure, in a case where the information output unit 170 is a device or the like that outputs hearing information, the information detection unit 140 be a device or the like that detects vibration.

According to the above-described configuration, since it becomes possible to use an acceleration sensor or the like for detecting vibration as the information detection unit 140, it becomes possible to improve the SN ratio and to execute the self-diagnosis processing with higher accuracy.

It is preferable that in the self-diagnosis apparatus 100 according to a twentieth aspect of the present disclosure, the information output unit 170 and the information detection unit 140 be connected by a vibration transmission medium 180, and hearing information outputted from a plurality of the information output units be detected by one of the information detection unit 140.

According to the above-described configuration, since it becomes possible for the information detection unit 140 to surely detect vibration outputted from the information output unit 170 with the vibration transmission medium 180, it becomes possible to improve the SN ratio and to execute the self-diagnosis processing with higher accuracy. In addition, since it becomes possible to detect vibration information outputted from a plurality of information output units 170 by using one information detection unit 140, the freedom in arrangement is improved by reducing the number of information detection units 140, making it possible to reduce the cost.

It is preferable that in the self-diagnosis apparatus 100 according to a twenty-first aspect of the present disclosure, the abnormality judgment unit 114 output the abnormality information to the information output unit 170 that is judged to operate normally by the self-diagnosis processing.

According to the above-described configuration, since it becomes possible to output the abnormality information from the information output unit 170 that operates normally, it becomes possible to more surely allow the user to recognize the abnormality information. In addition, since no configuration dedicated to outputting abnormality information is needed, it becomes possible to achieve reduction in size and cost of the apparatus.

It is preferable that in the self-diagnosis apparatus 100 according to a twenty-second aspect of the present disclosure, the abnormality judgment unit 114 output the abnormality information to at least one of the information output unit that is capable of displaying text information or image information, or the information output unit that is capable of broadcasting voice information.

According to the above-described configuration, it becomes possible for the user to more promptly and surely recognize the information output unit 170 in which a failure has occurred.

It is preferable that a self-diagnosis system 400 according to a twenty-third aspect of the present disclosure comprise: the self-diagnosis apparatus 100 according to any one of the first aspect to the twenty-second aspect; the information output unit 170; and a drive unit 160 that drives the information output unit 170.

According to the above-described configuration, it becomes possible to diagnose, at an appropriate timing in advance, whether or not the information output unit 170 can output information normally when the information output unit needs to output the information.

It is preferable that in the self-diagnosis system 400 according to a twenty-fourth aspect of the present disclosure, abnormality information be transmitted to an electronic apparatus 300 used by a user, and the user be notified of the abnormality information when the user accesses the electronic apparatus 300.

According to the above-described configuration, since the user not only recognizes abnormality information inside the control target 10 or the like but also can recognize abnormality information when accessing the electronic apparatus 300, it becomes possible to suppress an occurrence of a situation where the user accidentally forgets and misses the timing for repair.

It is preferable that the self-diagnosis system 400 according to a twenty-fifth aspect of the present disclosure be mounted on a vehicle.

According to the above-described configuration, since the user can be notified of processing such as repair of the information output unit 170 mounted on the vehicle at an appropriate timing, it becomes possible to improve the reliability from the user for the information output unit 170 mounted on the vehicle.

It is preferable that in the self-diagnosis system 400 according to a twenty-sixth aspect of the present disclosure, the self-diagnosis apparatus 100 further comprise a transmission unit 190, and the transmission unit 190 transmit the abnormality information to an outside of the self-diagnosis system.

According to the above-described configuration, it is possible for the outside of the self-diagnosis system 400 to be notified of and recognize the abnormality of the information output unit 170 even in a case where there is no information output unit 170 that operates normally.

Supplementation of Embodiments

While the embodiments of the invention have been described above, the disclosed inventions are not limited to the embodiments, but it could be understood by those skilled in the art that various modifications, corrections, alternatives, replacements, and the like can be made thereto. While specific numerical examples have been used to facilitate understanding of the invention, the numerical values are only an example and appropriate values may be used, unless otherwise specified. The sorting of articles in the above description is not essential to the invention, but details described in two or more articles may be combined for use if necessary, or details of a certain article may be applied to details described in another article (unless incompatible). The boundaries of the functional units or the processing units in the functional block diagrams cannot be said to correspond to boundaries of physical components. The operations of a plurality of functional units may be performed by a single physical component or the operation of a single functional unit may be performed by two or more physical components. The processing procedures described in the embodiments may be changed in the order as long as they are not incompatible with each other. While the self-diagnosis apparatus 100 has been described by using the functional block diagram for convenience of description of the processing, such apparatus may be implemented by hardware, software, or combination thereof. Software operated by a processor included in the self-diagnosis apparatus 100 in accordance with the present embodiments may be stored in a random access memory (RAM), a flash memory, a read only memory (ROM), an EPROM, an EEPROM, or a register. In addition, the software operated by the processor included in the self-diagnosis apparatus 100 in accordance with the present embodiments may be stored in any other appropriate storage medium such as hard disk (HDD), a removal disk, a CD-ROM, a database, or a server.

Notification of information is not limited to the aspects/embodiments described in the present disclosure, but may be performed using another method such as, for example, physical layer signaling, upper layer signaling, other signals, or combinations thereof. In addition, notification of predetermined information (for example, notification of "being X") is not limited to explicitly conducted notification, but may be implicitly conducted (for example, the notification of predetermined information is not conducted).

The aspects/embodiments described in the present disclosure may be applied with a combination of a plurality of systems.

The processing procedures, sequences, flowcharts, and the like may be changed in the order as long as they are not incompatible with each other. For example, while elements of various steps have been presented by using illustrative procedures in the description of the methods in the present disclosure, the methods are not limited to the presented specific procedures.

Inputted and outputted information and the like may be stored, for example, in a specific place such as a memory, or may be managed by using a management table, and may be overwritten, updated, or added. Outputted information and the like may be deleted. Inputted information and the like may be transmitted to another apparatus.

Judgment in the present disclosure may be conducted, for example, by comparison of numerical values such as comparison with a predetermined value, may be conducted by using a value represented with 1 bit (0 or 1), or may be conducted a true or false value (Boolean: true or false).

The respective aspects/embodiments described in the present disclosure may be used alone or may be used in combination, and may be switched to be used in association with the execution.

Software shall be broadly interpreted to mean codes, code segments, program codes, programs, subprograms, software modules, applications, software applications, software packages, routines, subroutines, objects, executable files, execution threads, procedures, functions, and the like. In addition, it does not matter if software is called firmware, middleware, microcodes, hardware description language, or other names.

In addition, software, information, and the like may be transmitted and received through a transmission medium. For example, in a case where software is transmitted from a website, a server, or another remote source by using a wired technology, the wired technology is encompassed by the definition of a transmission medium. The wired technology includes coaxial cables, optical fiber cables, twisted pairs, Digital Subscriber Lines, and the like. In addition, in a case where software, information, and the like are transmitted from a website, a server, or another remote source by using a wireless technology such as an infrared ray, a microwave, or the like, the wireless technology is also encompassed by the definition of a transmission medium.

Information, signals, bits, and the like described in the present disclosure may be represented by using any of various different technologies such as a voltage, a current, an electromagnetic wave, a magnetic field, or magnetic particles, an optical field or photons, or any combinations of these, for example.

Note that terms described in the present disclosure and terms necessary to understand the present disclosure may be replaced with terms having the same or similar meanings.

In addition, information, parameters, and the like described in the present disclosure may be expressed by using values relative to predetermined values or absolute values, or may be expressed by using another corresponding information.

Names used in the aforementioned parameters are not limited names in any point. Since various information elements can be identified by any favorable names, various names assigned to these various information elements are not limited names in any point.

The term "determining" used in the present disclosure may encompass various types of operations such as, for example, judging, calculating, computing, processing, and deriving. In addition, "determining" may include, for example, investigating, searching, inquiring, and ascertaining a table or a database. In addition, "determining" may include receiving (for example, receiving information), transmitting (for example, transmitting information), inputting, and outputting. Moreover, "determining" may include, for example, accessing data in a memory. In addition, "determining" may include resolving, selecting, choosing, establishing, comparing, and the like. In other words, "determining" may include "determining" some operations. In addition, "determining" may be interpreted as "assuming", "expecting", "considering", "supposing", or the like.

The terms "connected" and "coupled" or any variations of these mean any direct or indirect connection or coupling between two or more elements. Cases where one or more intermediate elements are present between two elements "connected" or "coupled" to each other may be included. Coupling or connection of elements may be physical or logical, or a combination of these. For example, "connected" may be interpreted as "access". In the case of using the present disclosure, it may be considered that two elements are "connected" or "coupled" to each other by using at least one of one or more electric wires, cables, and printed electrical connections. In addition, as some non-limiting and non-inclusive examples, it may be considered that two elements are "connected" or "coupled" to each other by using electromagnetic energy having a wavelength in a radio frequency range, a microwave range, and an optical (both visible and invisible) range.

The description "based on" used in the present disclosure does not mean "based on only" unless otherwise clearly stated. In other words, the description "based on" means both "based on only" and "based on at least".

Any reference to elements using designations "first", "second", and the like used in the present disclosure does not limit the amounts or order of these elements in general. These designations may be used in the present disclosure as a convenient way of distinguishing between two or more elements. Thus, references to the first and second elements do not imply that only two elements may be employed, or that in some way the first element must precede the second element.

"Unit" in the configuration of each above-described apparatus may be interpreted as "means", "circuit", "device", or the like.

The terms "include", "including", and variations of these used in the present disclosure are intended to be inclusive as is the term "comprising". Furthermore, the term "or" used in the present disclosure is intended not to be exclusive-OR.

In the present disclosure, in the case where articles are added by translation like a, an, and the in English, the present disclosure may include that the nouns following these articles are plural.

In the present disclosure, the term "A and B are different" may mean "A and B are different from each other". Note that the term may mean "A and B are each different from C". The term "coupled" and the like may also be interpreted in the same way as "different".

Although the present disclosure has been described in detail so far, it is obvious that the present disclosure is not limited to the embodiments described in the present disclosure. The present disclosure may be implemented as modifications and variations without departing from the gist and scope of the present disclosure defined by the claims. Therefore, the description of the present disclosure is for illustrative purposes only, and is not intended to have any restrictive meaning with respect to the present disclosure.

The invention claimed is:

1. A self-diagnosis apparatus that conducts self-diagnosis on an information output unit that outputs at least one information of control information on a control target electronically controlled by an electronic control apparatus or information demanded by a user who uses the control target, comprising:

a self-diagnosis control unit that outputs a predetermined self-diagnosis information to the information output unit;

an information detection unit that detects output information outputted from the information output unit in accordance with the self-diagnosis information, and outputs a result of the detection as detection information; and an abnormality judgment unit that compares the self-diagnosis information and the detection information during a predetermined synchronization window period, and in a case where difference information of a result of the comparison exceeds predetermined range information, judges that there is abnormality in the information output unit and outputs abnormality information;

wherein weighting of the self-diagnosis information and the detection information which are compared at start and end of the synchronization window period is smaller than weighting of the self-diagnosis information and the detection information which are compared at a center portion of the synchronization window period; and wherein the control target is controlled at least partly based on the self-diagnosis.

2. The self-diagnosis apparatus according to claim 1, wherein the predetermined range information is an effective range of the detection information which is generated by a variation present between pattern information indicated by the self-diagnosis information and pattern information indicated by the detection information.

3. The self-diagnosis apparatus according to claim 1, wherein in a case where the information output unit is an apparatus that outputs sight information, a light adjustment apparatus is provided in a line of sight between the information output unit and the user, and during the self-diagnosis processing, light transmittance of the light adjustment apparatus is lowered, while in a case other than during the self-diagnosis processing, the light transmittance of the light adjustment apparatus is raised.

4. The self-diagnosis apparatus according to claim 1, wherein in a case where the information output unit is an apparatus that outputs hearing information, the information detection unit is a sound collecting apparatus, and hearing information outputted from a plurality of the information output units is detected by one of the information detection unit.

5. The self-diagnosis apparatus according to claim 1, wherein in a case where the information output unit is an apparatus that outputs hearing information, the information detection unit is an apparatus that detects vibration.

6. The self-diagnosis apparatus according to claim 1, wherein the information output unit and the information detection unit are connected by a vibration transmission medium, and hearing information outputted from a plurality of the information output units is detected by one of the information detection unit.

7. The self-diagnosis apparatus according to claim 1, wherein the abnormality judgment unit outputs the abnormality information to the information output unit that is judged to operate normally by the self-diagnosis processing.

8. The self-diagnosis apparatus according to claim 1, further comprising:

a judgment timing determination unit that determines, in advance, a timing to initiate the synchronization window period in synchronization with a timing when the self-diagnosis information is outputted from the self-diagnosis control unit, the detection information is inputted to the abnormality judgment unit, and the abnormality judgment unit initiates the comparison.

9. The self-diagnosis apparatus according to claim 8, wherein the abnormality judgment unit outputs the abnormality information to at least one of the information output unit that is capable of displaying text information or image information, or the information output unit that is capable of broadcasting voice information.

10. The self-diagnosis apparatus according to claim 1, further comprising:

a self-diagnosis initiation detection unit that outputs a self-diagnosis initiation signal instructing the self-diagnosis control unit to output the self-diagnosis information, wherein the self-diagnosis initiation detection unit outputs the self-diagnosis initiation signal to the self-diagnosis control unit at a predetermined timing.

11. The self-diagnosis apparatus according to claim 10, wherein the self-diagnosis initiation detection unit outputs the self-diagnosis initiation signal to the self-diagnosis control unit at a timing when the electronic control apparatus and the self-diagnosis apparatus are powered on.

12. The self-diagnosis apparatus according to claim 10, wherein the self-diagnosis initiation detection unit outputs the self-diagnosis initiation signal to the self-diagnosis control unit at at least one of a timing before start of initialization processing of the electronic control apparatus, a timing in a middle of the initialization processing, and a timing immediately after end of the initialization processing when the electronic control apparatus and the self-diagnosis apparatus are powered on.

13. The self-diagnosis apparatus according to claim 10, wherein the self-diagnosis initiation detection unit outputs the self-diagnosis initiation signal to the self-diagnosis control unit such that while information is being outputted from the information output unit, self-diagnosis processing on another information output unit is executed.

14. The self-diagnosis apparatus according to claim 10, wherein in a case where output processing in which information on control of the control target or information demanded by the user is outputted from the information output unit is detected, the self-diagnosis initiation detection unit outputs the self-diagnosis initiation signal to the self-diagnosis control unit such that self-diagnosis processing on the information output unit is executed before the output processing.

15. The self-diagnosis apparatus according to claim 10, wherein in a case where the abnormality judgment unit judges that a noise component of the detection information is equal to or more than a predetermined value, the self-diagnosis initiation detection unit does not output the self-diagnosis initiation signal to the self-diagnosis control unit.

16. The self-diagnosis apparatus according to claim 10, wherein in a case where an amount of change in sensor information outputted from a sensor provided in the control target controlled by the electronic control apparatus exceeds a predetermined range, the self-diagnosis initiation detection unit does not output the self-diagnosis initiation signal to the self-diagnosis control unit.

17. The self-diagnosis apparatus according to claim 16, wherein in a case where the control target is a vehicle, upon receipt of sensor information indicating that the vehicle is turning a winding road or a corner road, or sensor information indicating that the vehicle has approached an intersection, the self-diagnosis initiation detection unit does not output the self-diagnosis initiation signal to the self-diagnosis control unit.

18. The self-diagnosis apparatus according to claim 1, wherein the self-diagnosis information is information processed such that the output information of the information output unit is not perceived by the user.

19. The self-diagnosis apparatus according to claim 18, wherein in a case where the information output unit is an apparatus that outputs hearing information, the self-diagnosis information is information instructing the information output unit to output a frequency lower or higher than an audible frequency band of human.

20. The self-diagnosis apparatus according to claim 18, wherein in a case where the information output unit is an apparatus that outputs sight information, the self-diagnosis information is information instructing the information output unit to output light of a wavelength of at least part of light of a wavelength band contained in the sight information.

21. The self-diagnosis apparatus according to claim 20, wherein the self-diagnosis information is information processed such that light is outputted in a form of pulse and has such brightness that the light is not perceived by the user.

22. A self-diagnosis system comprising:

the self-diagnosis apparatus according to claim 1;

the information output unit; and a drive unit that drives the information output unit.

23. The self-diagnosis system according to claim 22, wherein the abnormality information is transmitted to an electronic apparatus used by the user, and the user is notified of the abnormality information when the user accesses the electronic apparatus.

24. The self-diagnosis system according to claim 22 that is mounted on a vehicle.

25. The self-diagnosis system according to claim 22, wherein the self-diagnosis apparatus further comprises a transmission unit, and the transmission unit transmits the abnormality information to an outside of the self-diagnosis system.

* * * * *